(12) United States Patent
Tajiri et al.

(10) Patent No.: US 6,482,092 B1
(45) Date of Patent: Nov. 19, 2002

(54) IMAGE-DISPLAY GAME SYSTEM AND INFORMATION STORAGE MEDIUM USED THEREFOR

(75) Inventors: Satoshi Tajiri, Setagaya-ku (JP); Tsunekazu Ishihara, Chuo-ku (JP)

(73) Assignees: Nintendo Co., Ltd., Kyoto (JP); Game Freak Inc., Tokyo (JP); Creatures, Inc., Tokyo (JP)

( * ) Notice: Subject to any disclaimer, the term of this patent is extended or adjusted under 35 U.S.C. 154(b) by 0 days.

(21) Appl. No.: 09/580,548

(22) Filed: May 30, 2000

(30) Foreign Application Priority Data

Aug. 26, 1999 (JP) ............................. 11-283279
Nov. 19, 1999 (JP) ............................. 11-330724

(51) Int. Cl.[7] .................................. A63F 13/00
(52) U.S. Cl. .......................... 463/43; 463/42; 463/23
(58) Field of Search ........................ 463/42, 23, 7, 463/8, 40, 31, 43

(56) References Cited

U.S. PATENT DOCUMENTS 4,180,805 A  12/1979  Burson (List continued on next page.)

FOREIGN PATENT DOCUMENTS

| JP | 1-107187    | 4/1989  |
| JP | 6-218088    | 8/1994  |
| JP | 7-181056    | 7/1995  |
| JP | 8-84894     | 4/1996  |
| JP | 8-103568    | 4/1996  |
| JP | 8-224349    | 9/1996  |
| JP | 9-146566    | 6/1997  |
| JP | 9-155064    | 6/1997  |
| JP | 10-277262   | 10/1998 |
| JP | 11-99276    | 4/1999  |
| JP | 11-109844   | 4/1999  |
| JP | 11-179055   | 7/1999  |
| JP | 11-299988   | 11/1999 |
| JP | 11-309273   | 11/1999 |
| WO | WO 98/14898 | 4/1998  |

OTHER PUBLICATIONS

Pokémon Pikachu packaging, Model No.: MPG–001, Nintendo of America Inc., 1998, 4 pages.
Tamagotchi Virtual Pet instructions, 6 pages, Bandai, 1996–1997.
Kantrowitz et al., Newsweek, p. 62, Jun. 9, 1997.
Lawson, New York Times, May 22, 1997.
Asahi National Broadcasting, "Tamapitchi Takes Off", Jun. 15, 1997.

(List continued on next page.)

*Primary Examiner*—Jessica J. Harrison
*Assistant Examiner*—Yveste G. Cherubin
(74) *Attorney, Agent, or Firm*—Nixon & Vanderhye P.C.

(57) ABSTRACT

An image-display game system which can attract players to play a game for a long time can be implemented by presenting helping data of a0 to a63, and b1 to b5 beneficial in the course of a game to friends, and accordingly communications accompanying therewith can be stimulated and activated thereamong, and the game can be effectively utilized as a communications tool. Such image-display game system is structured such that the player' ID data IDn is communicable or exchangeable therein. With the other player's ID received, items beneficial in the course of the game or helping data of 10 to 163, and b1 to b5 is generated based on the ID data, and is presented to the player. As a result, exchanging of the ID data IDn is activated among the players. The items presented based on the ID data IDn are determined by operating the ID data using an equation in FIG. 17, which is based on a predetermined rule or in an operation processing by combining the ID data IDn and a random number R.

11 Claims, 18 Drawing Sheets

U.S. PATENT DOCUMENTS

| | | | |
|---|---|---|---|
| 5,065,414 | A | 11/1991 | Endou et al. |
| 5,265,888 | A | 11/1993 | Yamamoto et al. |
| 5,267,734 | A | 12/1993 | Stamper et al. |
| RE34,728 | E | 9/1994 | Hall-Tipping |
| 5,370,399 | A | 12/1994 | Liverance |
| 5,390,937 | A | 2/1995 | Sakaguchi et al. |
| 5,498,002 | A | 3/1996 | Gechter |
| 5,645,513 | A | 7/1997 | Haydocy et al. |
| 5,649,862 | A | 7/1997 | Sakaguchi et al. |
| 5,746,656 | A | 5/1998 | Bezick et al. |
| 5,807,174 | A | 9/1998 | Fukuhara et al. |
| 5,810,665 | A | 9/1998 | Takemoto et al. |
| 5,833,536 | A | 11/1998 | Davids et al. |
| 5,833,540 | A | 11/1998 | Miodunski et al. |
| 5,855,512 | A | 1/1999 | Aoyama et al. |
| 5,885,156 | A | 3/1999 | Toyohara et al. |
| 5,935,003 | A | 8/1999 | Stephens et al. |
| 5,947,868 | A | 9/1999 | Dugan |
| 5,956,685 | A | 9/1999 | Tenpaku et al. |
| 5,999,622 | A | 12/1999 | Yasukawa et al. |
| 6,022,274 | A | 2/2000 | Takeda et al. |
| 6,039,648 | A | 3/2000 | Guinn et al. |
| RE36,675 | E | 4/2000 | Yamamoto et al. |
| 6,115,036 | A | 9/2000 | Yamato et al. |
| 6,117,009 | A | 9/2000 | Yoseloff |
| 6,183,367 | B1 * | 2/2001 | Kaji et al. ..................... 463/42 |

OTHER PUBLICATIONS

Scheyen, Peter, "Border Zone", Overview, Feb. 6, 1996.
Waijers, Boudewijn, "The Roguelike Games Home Page", May 13, 1996.
Waijers, Boudewijn, "The Rogue Home Page", Feb. 28, 1996.
Doherty, Paul David, "Infocom Fact Sheet", Sep. 3, 1995.
"Drawings on Napkins, Video Game Animation, and Other Ways to Program Computers", Ken Khan, Information Access Company and Association for Computing Machinery, vol. 39, No. 8, p. 49, Aug. 1996.
May, Scott, "We Need to Distinguish Ourselves From Edutainment", IDG Commucications, inc., InfoWorld, Aug. 13, 1984.
"C User's Journal", Apr. 1992.
PC Magazine, Oct. 2, 1984.
Gavin, Maurice, "The Hally Orrery: A program to show the comet's orbit", pp 64–66, *New Scientist, Spotters–Guide, Halley's Comet*, London England, 1985.
Master–Type– Rocky's Boots.
Border Zone: A Game of Intrigue.
"Time and Date in NetHack", Boudewijn Wayers.
The NetHack Home Page, Boudewijn Wayers, Jul. 12, 1996.
Press Release, "Activism 'Little Computer People' Project: Research Update", Activism, Mountain View, California, Jul. 12, 1985.
Emery, Jr., C. Eugene, "Who's the little guy in there?" *Knickerbocker News*, p. 22 Albany, New York, Dec. 16, 1985.
Adverstisement, "We're learning to love the little people who live inside computers", USA Today, Nov. 11, 1985.
Mulloy, Mike, "David, dog, and others live inside computers", Maywood Herald, Oak Park, Illinois, Jan. 29, 1986.
Katz, Arnie, "The Little Computer People Project", pp. 47–49, AHOY!, 03/86.
Research Update: Activism, "Little Computer People" Project, p. 9, Computer Entertainer, 8/85.
Bishop, David, "Little Computer People", Computer and Video Games, 1985.
Bartimo, Jim, "Q&A: David Crane", p84, Info World, Mar. 12, 1984.
Advertisement, "Who's living in your computer? It's me!", p. 62, Commodore Computing, 12/85.
Kristiansen, Rasmus Kirkegard, "The Little Computer Poeple– Hvor Kommer De Fra?", pp. 4–7, Soft, Jan.–Feb. 1986 (with translation).
Advertisement, "Unitsoft Distribution", Computer and Video Games, 5/86.
Mason Ralph, Little Computer People: Research Project, Win 64 Emulator (copyright), 1995.
Crane, David and Nelson, Sam, "Little Computer People", Activism, 1986.
Activision's Modern Computer People: human–like beings actually found living inside computers, (Activision, Mountain View, CA), pp. 1–12, 1985.
Advertisement, Little Computer People Discovery Kit, (Activision, Software, Mountain View, CA), 1985, 1986.
A Computer Owner's Guide to Care of and Communication with Little Computer People, (Activision, Mountain View, CA), 1985.
Activision Catalog, (Activision, Mountain View, CA), 1985.
InfoWorld, 1986.
Ryan, Bob, Dr.Floyd's Desktop Toys (MicoProse Entertainmenmt Pack vol. 1), McGraw Hill, Apr. 1993.
"Turn Up the Heat This Holiday Season With Nine Sizzling Games From Activision", PR Neswire Association, Dec. 7, 1995.
Jones, George, "MechWarriors mass for Network attack; new Net–Mech action game from Activision", Nov. 1995.
Tamagotchi Instructions, Bandai, 1996–1997.
Kantrowitz, Barbara and Namuth,Tessa, "A New Pet Rock for The Digital Generation", Newsweek, Jun. 9, 1997.
Lawson, Carol, "Love it, feed it, mourn it", New York Times, May 22, 1997.

* cited by examiner

Fig. 4   RAM25 (12)

| Captured Pokemon Data Region 12A | | | | | | | | | | | | |
|---|---|---|---|---|---|---|---|---|---|---|---|---|
| 1 | Poke-mon No. | HP | Exp. p | Level | State | Tech. | P. ID | Ability Attack Defense Special Attack Special Defense Speed | Miscella-neous | Sex | Item on-hand | Virus | Miscella-neous |
| 2 | Poke-mon No. | HP | Exp. p | Level | State | Tech. | P. ID | Ability Attack Defense Special Attack Special Defense Speed | Miscella-neous | Sex | Item on-hand | Virus | Miscella-neous |

120　121　122　123　124　125　126　127　128　12a　12b　12c　12d

| N | Poke-mon No. | HP | Exp. p | Level | State | Tech. | P. ID | Ability Attack Defense Special Attack Special Defense Speed | Miscella-neous | Sex | Item on-hand | Virus | Miscella-neous |
|---|---|---|---|---|---|---|---|---|---|---|---|---|---|

Conventional ── New Type

| On-Hand Pokemon Storage Region 12B | Battle Data Storage Region 12C | | Table Region 12D |
|---|---|---|---|
| Pokemon 1, Pokemon 2, Pokemon 3, Pokemon 4, Pokemon 5, Pokemon 6 | Opponent Character Data (Name, etc.) | Opponent Pokemon Data (HP, Level, etc.) | Item Table |

| Miscellaneous Storage Region 12E | | | |
|---|---|---|---|
| Location Data Playing Time Data Name Data and the like | Personal ID (Player) Rival's ID (Rival 1) Rival's ID (Rival 2) Rival's ID (Rival 3) Rival's ID (Rival 4) Rival's ID (Rival 5) | Item on-hand | Other New Data |
| 12f | 12g | 12h | 12i |

Fig. 15(a)

| Probability | Random Number (0 ~ 7) | C (R6×2+D) | Item |
|---|---|---|---|
| Most Common | R6 | 0<br>1<br>2<br>3<br>.<br>.<br>.<br>15 | Item a 0<br>Item a 1<br>Item a 2<br>Item a 3<br>.<br>.<br>.<br>Item a 15 |
| Popular | R6 | 0<br>1<br>2<br>3<br>.<br>.<br>.<br>15 | Item a 16<br>Item a 17<br>Item a 18<br>Item a 19<br>.<br>.<br>.<br>Item a 31 |
| Least Common | R6 | 0<br>1<br>2<br>3<br>.<br>.<br>.<br>15 | Item a 32<br>Item a 33<br>Item a 34<br>Item a 35<br>.<br>.<br>.<br>Item a 47 |
| Rare | R6 | 0<br>1<br>2<br>3<br>.<br>.<br>.<br>15 | Item a 48<br>Item a 49<br>Item a 50<br>Item a 51<br>.<br>.<br>.<br>Item a 63 |

Fig. 15(b)

| Item |
|---|
| Berry |
| Przcureberry |
| Mint Berry |
| Ice Berry |
| Burnt Berry |
| Psncureberry |
| Bitter Berry |
| Guard Spec. |
| X Defend |
| X Attack |
| Dire Hit |
| X Special |
| X Accuracy |
| Eon Mail |
| Morph Mail |
| Music Mail |

| | W < b1 | Item b 1 |
|---|---|---|
| b1 ≦ | W < b2 | Item b 2 |
| b2 ≦ | W < b3 | Item b 3 |
| b3 ≦ | W < b4 | Item b 4 |
| b4 ≦ | W | Item b 5 |

IMAGE-DISPLAY GAME SYSTEM AND INFORMATION STORAGE MEDIUM USED THEREFOR

BACKGROUND OF THE INVENTION

1. Field of the Invention

The present invention relates to image-display game systems and information storage media used therewith and, more specifically, to an image-display game system in which data exchange and data communications are possible by connecting at least two image-display game devices, and an information storage medium used therefor. In the exemplary embodiments herein, the image-display game system includes a video game machine and a portable game machine in which a game is played with game software including a game program for capturing, training, and trading (sometimes referred to herein as monsters or characters) stored therein.

2. Description of the Background Art

A game which is played for capturing, training, and/or trading monsters or characters is referred to as "Pocket Monster (versions in red, green, blue, and yellow)" (trade name; hereinafter, "prior art 1") and has been designed and distributed by the same assignee of this application. In this game, characters include pocket monsters (hereinafter, shortened as "pokemons").

In the prior art 1, the game is played for capturing, training, and trading pokemons (characters), and each version differs in probability of the pokemon' appearing. Each player captures and collects pokemons up to a predetermined number through trading pokemons or letting pokemons have battles. Pokemon data exchange is carried out through a cable, which connects connectors to a portable game machine.

A game machine utilizing a temporal factor is disclosed in Japanese Patent Examined Publication No. 7-98104 (95-98104) (hereinafter, prior art 2), Japanese Patent Examined Publication No. 7-98105 (95-98105) (prior art 3), and Japanese Patent Examined Publication No. 7-98106 (95-98106) (prior art 4). In these prior arts 2, 3, and 4, a calendar timer is provided in a game machine cartridge, and events take place when a predetermined date or a day of the week occurs.

The player can enjoy the game in the prior art 1 for a relatively long period without losing his/her interest. Further, prior art 1 aids in encouraging conversations and cultivating friendships through exchanging pokemons with friends. However, the players may lose their interest sooner or later if they play the same game for a long time. Furthermore, although the players can exchange pokemon or character data in the prior art 1, the exchangeable data type is limited to the pokemons, and there is no function of generating new items, which are beneficial in the course of the game, for example, by the data exchange.

With the prior arts 2, 3, and 4, the players enjoy the events, which take place only on the predetermined date or the day of the week, but enjoyment of capturing or trading characters is not available. Therefore, the players remember what event has taken place when playing the game repeatedly and thus may lose their interest in going through the same events and easily get bored.

By taking those factors into consideration, a main object of the present invention is to provide an image-display game system, which can stimulate the players to play the game for a long time, and an information storage medium used therefor. This is effectuated by encouraging and activating data exchange with friends and conversations thereabout, and the player may present helping or "help" data, such as items beneficial in the course of the game, to friends. Thereby, effectively utilizing the game machine as a communications tool.

Another object of the present invention is to provide an image-display game system of a type capable of generating various helping data with a high unexpectancy, and an information storage medium used therefor. This is effectuated by correlating a condition for generating the helping data, such as items beneficial in the course of the game with information inherent to the player's game machine, game machine cartridge (information storage medium), or both.

SUMMARY OF THE INVENTION

A first embodiment (claim 1) of the present invention is an image-display game system in which at least two image-display game devices are structured such that data communications is possible therebetween. The image-display game devices each comprises a program storage, a temporal storage, an actuator actuated by a player, a communications device, a processor, and a display.

The temporal storage includes a property data storage region, a helping data storage region, and an ID data storage region. Each of the storage regions is writable with data and readable data therefrom.

The game program storage previously stores a game program, and further generates the helping data processed by the processor of the other image-display game device based on the transferred ID data when one of the image-display game devices and the other image-display game device are made data communicable by the communications device and data communications is selected by the actuator and in response to the ID data transferred from one image-display game device to the other image-display game device. The game program storage stores a program for writing the helping data to the helping data storage region.

In the image-display game device which is a second embodiment (claim 2) of the present invention, the image-display game device includes a clock for counting time. The game program storage stores, in relation to the helping data processed based on the ID data, a program of writing time data indicated by the clock to the storage region of the temporal storage, a program of determining whether a predetermined length of time has passed based on the time data and a time currently indicated by the clock, and a program of prohibiting execution of generating the helping data based on another ID data different from the one which has been transmitted, when the determination program determines that the predetermined length of time has not yet passed.

In a third embodiment (claim 3) of the present invention, the image-display game device includes a clock. The game program storage stores a program of writing time data indicated by the clock to the storage region of the temporal storage in relation to the helping data processed based on the ID data, a first determination program of determining whether the ID data stored in the ID data storage region is identical to ID data transmitted through the communications device, a second determination program of determining whether a predetermined length of time has passed based on the time data and a time currently indicated by the clock, and a program of prohibiting execution of the helping data generation program based on the transmitted ID data, when the first determination program determines that the ID data is identical and the second determination program determines that the predetermined length of time has not yet passed.

In a fourth embodiment (claim 4) of the present invention, the image-display game device includes a clock. The game program storage stores a writing program of writing time data indicated by the clock to the storage region of the temporal storage in relation to the helping data processed based on the ID data, a first determination program of determining whether the ID data stored in the ID data storage region is identical to ID data transmitted through the communications device, a second determination program of determining whether a predetermined length of time has passed based on the time data and a time currently indicated by the clock, and a program of limiting a processing by the helping data generation program based on the transmitted ID data to be operated for a predetermined number of times or less, when the first determination program determines that the ID data is identical and the second determination program determines that the predetermined length of time has not yet passed.

In a fifth embodiment (claim 5) of the present invention, the communication device is an infrared transmitter/receiver which performs communications by infrared radiation.

In a sixth embodiment (claim 6) of the present invention, the helping data generation program included in the game program storage generates item data of an item beneficial for the game process, based on the transferred ID data.

In a seventh embodiment (claim 7) of the present invention, the helping data generation program included in the game program storage generates item data of an item beneficial for the game process and not obtainable in the normal game play, based on the transferred ID data.

An eighth embodiment (claim 8) of the present invention is an image-display game system, which comprises at least two sets of an information storage having a game program stored and an image-display game device detachable with the information storage medium, and further comprises a communications device provided to both of the information storage medium and the image-display game device in relation to either one of those two. The information storage medium comprises: a program storage in which a game program is unalterably stored; a temporal storage; and a housing in which the program storage and the temporal storage are housed. The temporal storage includes, at least, a property data storage region where property data varied in type is stored for every character captured in the course of a game, a helping data storage region where data for helping the game process is stored, and an ID data storage region where ID data for identifying a player is stored, and each of the storage regions is writable with data or readable data therefrom. The image-display game device comprises: an actuator actuated by the player; a processor, and an image display.

In a ninth embodiment (claim 9) of the present invention, the image-display game device is a portable game machine, and the communications device includes an infrared transmitter/receiver integrally provided to the housing of the information storage medium.

In a tenth embodiment (claim 10) of the present invention, the image-display game device is a portable game machine, and the communications device includes an infrared transmitter/receiver integrally provided to the image-display game device.

In the first embodiment of the present invention mentioned in the foregoing, the actuator is actuated by the player for, at least, an operation for capturing characters and an operation for performing data communications with another player. The communications device performs the data communications with the other player's image-display game device. With the program carried out, the processor performs an image processing to change an image on display in response to the actuator and changes the property data responding to the game process made, based on the state of the actuator to write the data in the storage region corresponding to the temporal storage.

In detail, by the processor subjecting the program stored in the program storage to processing, the temporal storage included in each of the image-display game devices stores the property data varied in type for every character captured in the course of the play, stores data helping the game process into the helping data storage region, and stores the ID data for identifying the player into the ID data storage region.

The display displays the result obtained by the processing carried out by the processor. Further, the game program storage generates, thorough processing by the processor, the helping data processed by the processor of the other image-display game device based on the transferred ID data and stores the helping data to the helping data storage region, when one of the image-display game devices and the other image-display game device are made data communicable by the communications device and when data communications is selected by the actuator, in response to the ID data transferred from one image-display game device to the other image-display game device.

In the eighth embodiment of the present invention, the actuator is actuated by the player for, at least, an operation for capturing characters and an operation for performing data communications with another player. The processor carries out information processing in response to the actuator and based on the program. The image display displays an image obtained through processing carried out by the processor. Furthermore, with the program stored in the program storage carried out, the processor carries out image processing to change an image on display in response to the actuator and changes the property data to be written into the temporal storage responding to the game process made based on the state of the actuator to change the character' images based on the property data.

The game program storage further generates the helping data processed by the processor of the other image-display game device based on the transferred ID data and stores the helping data to the helping data storage region, in response to one of the image-display game devices and the other image-display game device are made data communicable by the communications device and the ID data transferred from one image-display game device to the other image-display game device.

As described in the foregoing, according to the present invention, the players exchange both their ID data at the time of data exchange or communications, and, based on the ID data, the helping data, such as items beneficial in the course of the game, is presented. Accordingly, data exchange with many friends and communications accompanying therewith can be encouraged and activated, and the game machine can be effectively utilized as a communications tool. As a result, the players can be effectively stimulated to play the game for a long time.

Further, a condition for generating the helping data, such as items beneficial in the course of the game, is correlated with information (ID data) inherent to the player's game machine, game machine cartridge (information storage medium), or both. As a result, various helping data can be generated with a high unexpectancy. In this manner, the game becomes more interesting, and a game software or a game system, which can encourage the players to perform data exchange or communications with many friends, can be implemented.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a memory map for RAM 12 (RAM 25) shown in FIG. 2;

FIG. 15 is a diagram in assistance of explaining an item selection method shown in FIG. 14;

DESCRIPTION OF THE PREFERRED EMBODIMENTS

Figure 1:
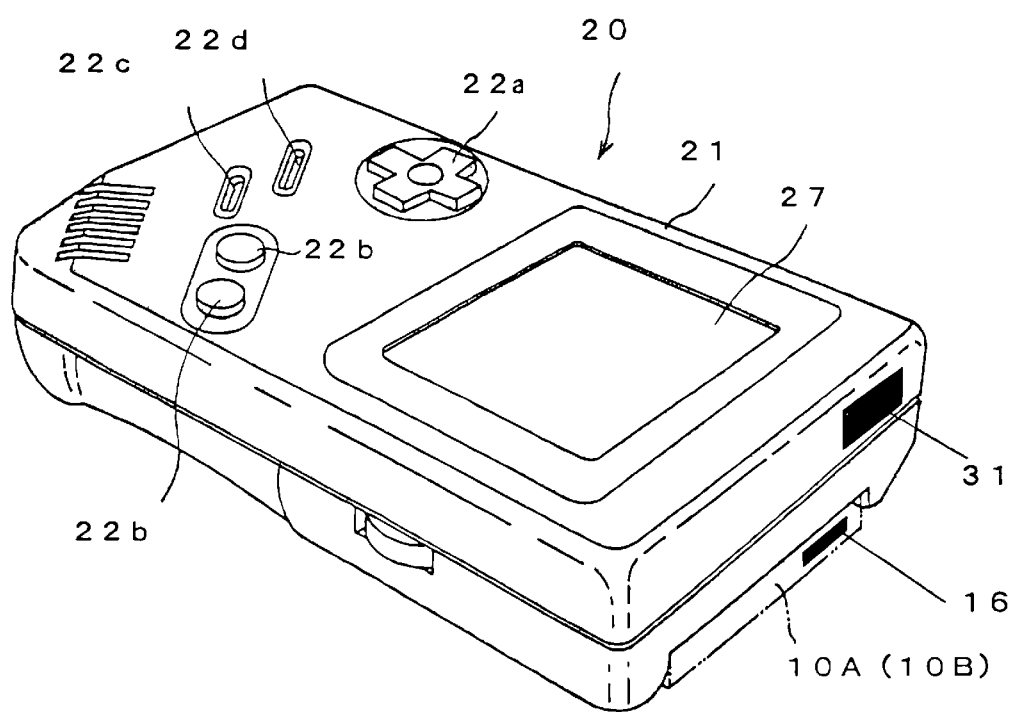
FIG. 1 is an external view of a portable game machine to which an image-display game system according to an embodiment of the present invention is applied.
Figure 2:
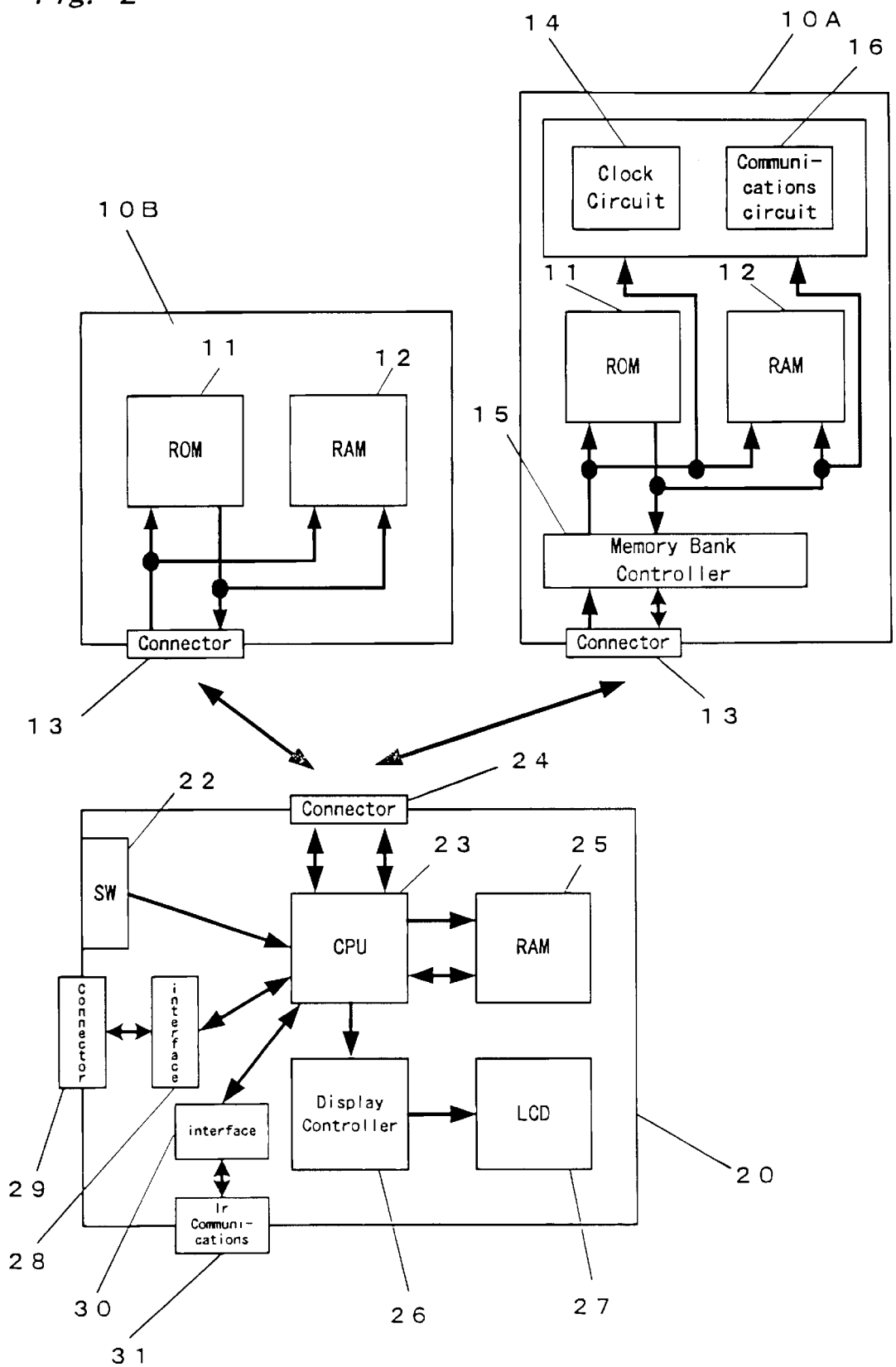
FIG. 2 is a block diagram showing the structure of the image-display game system shown in FIG. 1.

In FIG. 1, an external view of a portable game machine to which an image-display game system according to an embodiment of the present invention applied is shown. In FIG. 2, the structure of the portable game machine in FIG. 1 is shown. As shown in FIG. 1, the image-display game system according to the present embodiment is structured by a game cartridge 10A, which is an example of information storage medium, and a portable game machine 20, which is an example of image-display game machine engageable with the game cartridge 10A in a detachable manner. There are at least two portable game machines 20, each attached with the game cartridge 10A or a conventional game cartridge 10B.

The game cartridge (or ROM cartridge; hereinafter, referred simply to as "cartridge") 10A includes, as shown in FIG. 2, program storage means, exemplarily implemented by nonvolatile memory (hereinafter, "ROM") 11; temporal storage means by readable/writable memory (hereinafter, "RAM") 12; a connector 13; a clock circuit (timer) 14; a memory bank switch control circuit 15; and communications means (circuit) exemplarily implemented by infrared transmitter/receiver 16, and all of which are mounted on a substrate (not shown). The substrate is housed in a case or a housing (not shown). ROM 11, RAM 12, clock circuit 14, memory bank switch control circuit 15, and infrared transmitter/receiver 16 are respectively coupled to terminals of the connector 13 through data bus and address bus, and then are coupled to a connector 24 of the portable game machine 20. As is known from a left in FIG. 2, the conventional cartridge 10B includes the ROM 11, RAM 12, and connector 13.

Figure 3:
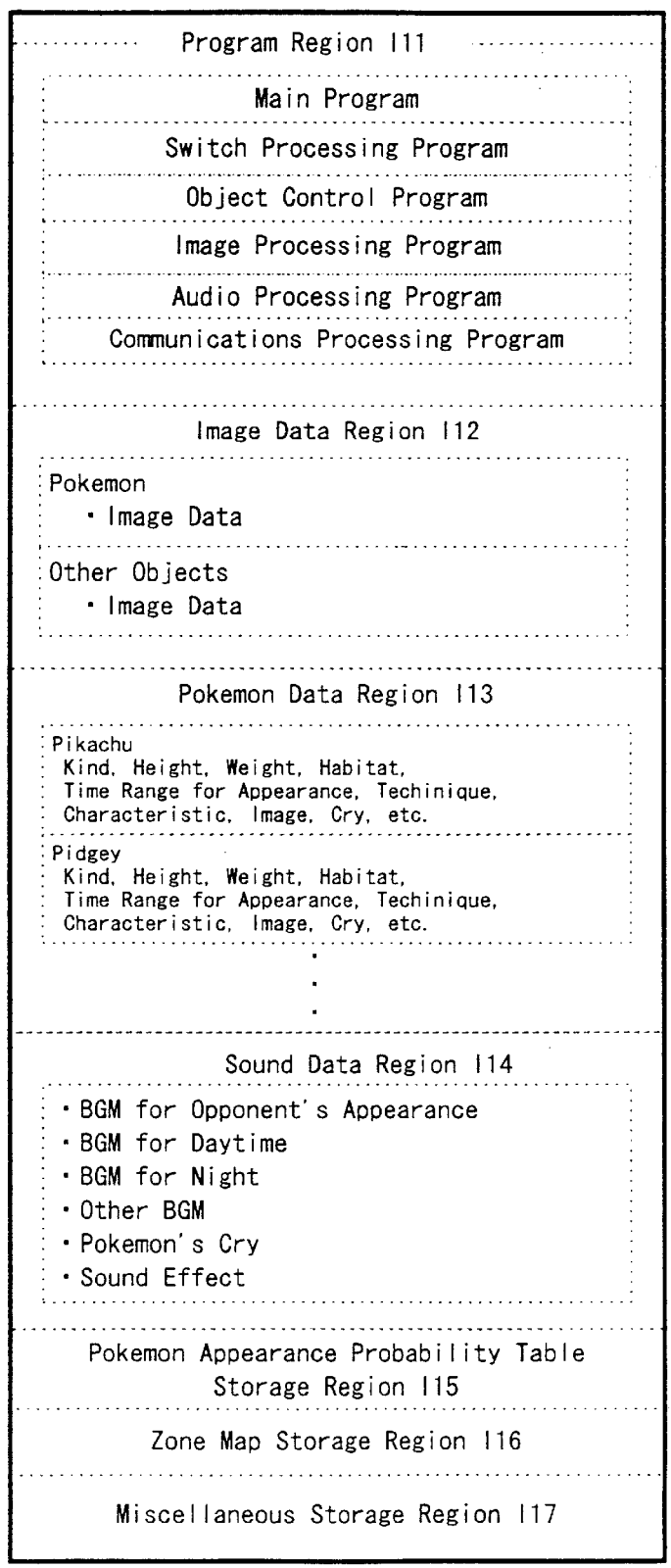
FIG. 3 is a memory map for ROM 11 shown in FIG. 2.

The nonvolatile memory 11 unalterably stores a game program, and exemplarily implemented by ROM, flash memory, or EE-PROM. The ROM 11 includes, as shown in FIG. 3, storage regions of I11 to I17 each for storing various program data, image data, or setting data.

More specifically, a program region I11 stores programs relevant to game details such as main program, switch processing program, object (or character) control program, image processing program, audio processing program, and the like. If the game includes capturing and training pokemons, exemplary programs relevant to the game details including a capturing program and a training program are stored. In addition thereto, a program for storing DOT (image) data for the respective pokemons and exchanging data among other game machines 20' (not shown), and a program for ensuring compatibility with the conventional cartridges 10B are stored.

An image data region I12 is for storing, separately, image data for every pokemon to be appeared in the game and that for other objects (characters) such as human being, background, or items to be displayed. A pokemon data region I13 stores property data for distinguishing every pokemon by name, kind, height (stature), weight, habitat, time range for appearance, possible technique, characteristic, cry, and the like.

A sound data region I14 stores data for sound effects and BGM for the game. In detail, BGM data depending on the game scene such as an opponent's appearing, or in the daytime or at night, and digital data for pokemon' cry and sound,effects are stored.

A pokemon appearance probability table storage region I15 stores, for every pokemon, both habitat and appearance probability data. The appearance probability data is stored such that the appearance probability varies between daytime and night, as required.

A zone map storage region I16 stores a zone range where a main character activated by the player can move, and data for a map of the zone.

A miscellaneous storage region 117 stores miscellaneous data, such as a processing program for determining, exemplarily on the basis of ID data, or an item to present as a gift (or give) to a player, who is a partner of data exchange or communications.

Hereinafter, when there is no need to discriminate the cartridge between new-type or conventional, the cartridge is collectively denoted by a reference numeral 10.

The RAM 12 has a region for storing property data varied in type respectively for the characters captured in the course of the game. Such storage region on the RAM 12 includes, as shown in FIG. 4, a captured pokemon data region 12A for storing any captured (or obtained) pokemon, an on-hand pokemon storage region 12B, a battle data storage region 12C, a table region 12D, and a miscellaneous storage region 12E.

The captured pokemon data region 12A includes areas 120 to 128 and 12a to 12d for every pokemon character, which is a fictionally-created monster.

The area 120 is an area for storing pokemon codes (or pokemon numbers).

The area 121 stores a hit point (HP), for each pokemon code, which indicates the pokemon's power.

The area 122 stores the pokemon's experience point.

The area 123 stores the pokemon's level.

The area 124 stores the pokemon's status.

The area 125 stores data relevant to the pokemon's possible attack (technique).

The area 126 stores parental ID data indicating who captured the pokemon (the player's name or ID data).

The area 127 stores ability value of attack, defense, special attack, special defense, speed, and the like.

The area 128 is an area left vacant for storing data not defined yet.

The area 12a stores the pokemon's sex.

The area 12b stores items on hand, exemplarily weapons available for the pokemon to fight against opponents.

The area 12c stores data (virus data) indicating whether the pokemon has been infected by any virus, data indicating the virus type if infected, or both.

The area 12d is an area left vacant for storing miscellaneous data.

The areas 120 to 128 are storage areas provided to both of the new-type cartridge 10A and the conventional cartridge 10B, and any data stored therein is compatible. The areas 12a to 12d are unique only to the new-type cartridge 10A.

The on-hand pokemon data storage region 12B stores six pokemon codes or pokemon numbers assigned to those selected by the player among from those stored in the captured pokemon data region 12A. These six pokemons can travel with the main character.

The battle data storage region 12C stores another player's (trainer's) name, with whom the player is having a battle with through a communications cable 40, and various data relevant to his/her pokemons joined in the battle (e.g., pokemon number, HP, level). The battle data storage region 12C includes an area for storing battle character data (pokemon' names), and an area for storing data, for every pokemon joined the battle, corresponding to the areas 120 to 12d.

The table region 12D stores table data for determining an item to be presented in response to ID code communicated or exchanged by using the infrared transmitter/receiver 16, and data for determining an item to be presented, based on the number of steps, in response to step-number data provided through communications with a pedometer-incorporated game machine 50.

The miscellaneous storage region 12E includes areas 12f, 12g, 12h, and 12i. The area 12f is an area for storing the player's name data as a part of the ID data. Soon after the time of purchase, the player actuates operation switches 22a and 22b to store his/her name or nickname therein.

The area 12g includes an area for storing the player's own ID data and an area for storing other ID data for a predetermined number of players (5 players). To the area for storing the player's own ID data in the area 12g, ID data determined based on the player's name or nickname stored after the purchase of the cartridge 10A and random numbers is automatically written. To the area for storing other player' ID data in the area 12g, their ID data (ID codes) transmitted from their portable game machines 20 is successively written for a predetermined number of players. With respect to each ID data stored in the area, time data (e.g., time, date) indicating when data communications was made is also written.

By additionally storing time data for each ID data, the area 12g receives ID data limited on a one-person-one-ID-data basis, thereby preventing any identical ID data from being received many times in a single day. Further, by setting the upper limit for the ID data to be stored, for example, to 5, the area 12g stops storing ID data once reached the upper limit regardless of the number of players communicating (or exchanging data) for the day. In this manner, the player is thus encouraged to have communications with various players for each day, rather than sticking to only one player. As such, the game can help players to make friends and further, to improve communications thereamong.

To the area 12h, item data relevant to, for example, helping items is written. The helping items are presented based on random numbers generated in accordance with other player' ID data obtained through communications or numbers obtained by computing such ID data with a predetermined equation. These helping items are beneficial in the course of the game, and include medicine for accelerating pokemon' growth or evolution, protective gear against opponent' attack, medicine for restoring pokemon' lives, and the like.

Such helping items (helping data) provided based on the ID data are preferably not obtainable only by playing the game. Accordingly, the player becomes willing to communicate with other players to exchange ID data, and thus data communications among players is encouraged.

The area 12i stores data for other player's pokemons having the battle with, for example six, and the player's name. After once written into the area 12i through data communications, such pokemon data becomes available for the user's battle strategy throughout the battle.

The clock circuit 14 includes a timer at least counting time, and if required, indicating date (month/day) and day of the week. When a memory chunk of the ROM 11 is too large for an address bus to address, the memory bank switch control circuit 15 divides the memory chunk into a plurality of memory banks, and generates bank data for the higher address in the ROM 11 and for addressing a memory chunk on the RAM 12. It is herein preferable to integrate the clock circuit 14 and the memory bank switch control circuit 15 on a one-chip integrated circuit (IC) so as to reduce the number of chips and cost.

As shown in FIG. 1, the portable game machine 20 includes the operation switches 22 arranged on the lower part of the surface (plane) of a housing 21, and a liquid crystal display 27 placed on the upper part thereof. In the housing 21, the circuit board having the constituents as shown in FIG. 2 mounted thereon is accommodated. The operation switches 22 include a direction switch 22a used to move a cursor and direct any character available for the player in desired directions, an action switch 22b used for an action command, a start switch 22c, and a selection switch 22d.

To be more specific, the portable game machine 20 is equipped with a central processing unit (CPU) 23. The connector 24 is connected to the CPU 23 for connection with the cartridge 10. A working RAM 25 for temporarily storing data for game processing, and a display control circuit 26 are also connected thereto. When a mode (continue mode) of continuing the previously-played game is selected at the start of the game, the RAM 25 is supplied with backup data stored on the RAM 12 in the cartridge 10A. Therefore, the RAM 25 is allocated with the same storage regions or areas as with the RAM 12. In the following description, the storage region or area for the RAM 25 is under the same name and reference numeral provided to that of the RAM 12.

The liquid crystal display (LCD) 27 is connected to the display control circuit 26. A connector 29 is connected to the CPU 23 via an interface 28. The connector 29 is connected to a connector 29' provided to other portable game machine 20' via a cable which is the communications means for pokemon trading with the owner (player) of the portable game machine 20'. As an alternative to such cable, the infrared transmitter/receiver 16 in the cartridge 10A is a possibility. Or instead of the infrared transmitter/receiver 16, an infrared transmitter/receiver 31 may be integrally attached to the housing of the portable game machine 20.

Figure 5:
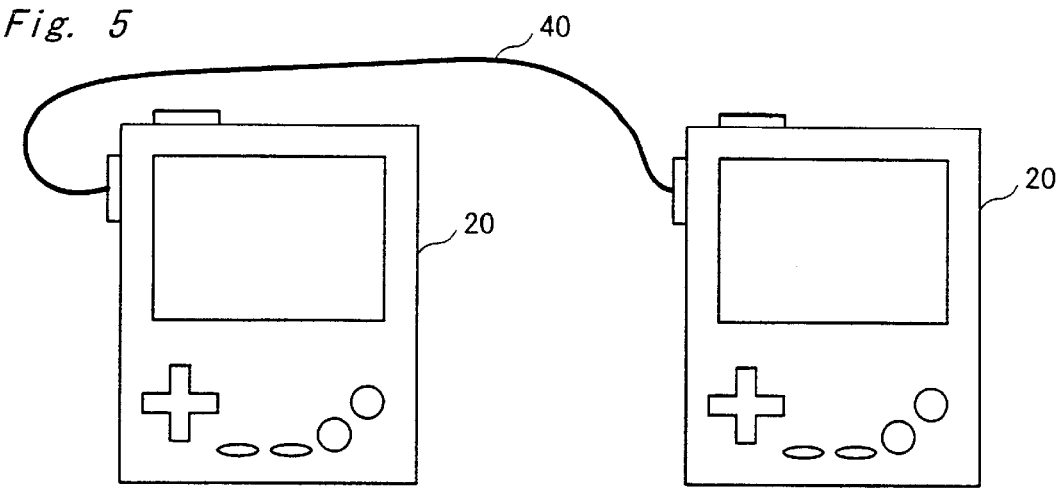
FIG. 5 is a diagram showing the system construction for executing data communications between two portable game machines connected by a cable to each other.
Figure 6:
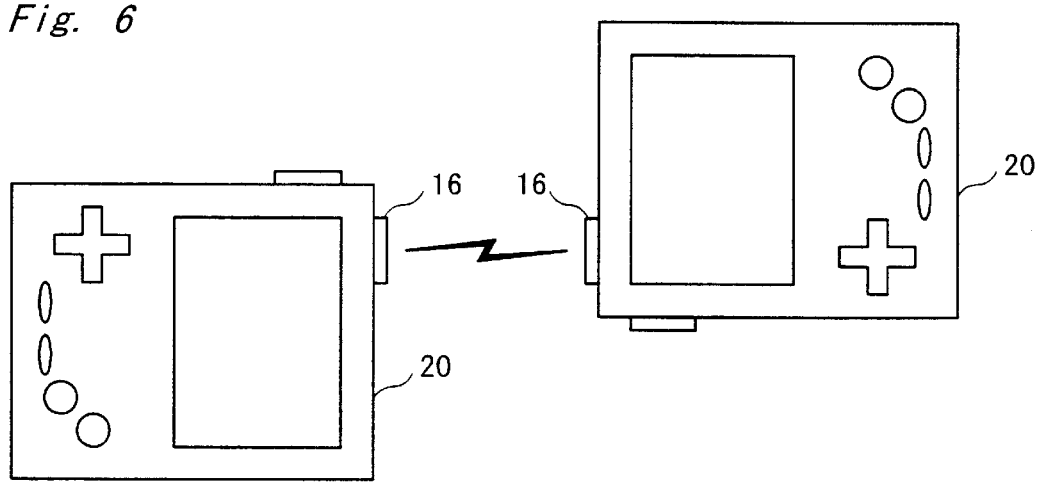
FIG. 6 is a diagram showing the system construction for executing data communications between two game machines utilizing an infrared transmitter/receiver.

FIGS. 5 and 6 exemplarily show how two game machines according to the embodiment of the present invention are connected for data communications or data exchange. In FIG. 5, two portable game machines 20 are exemplarily connected to each other via the cable 40 for data communications.

In FIG. 6, two game machines 20 perform data communications therebetween with the infrared transmitter/receivers 16. These two game machines 20 are wirelessly connected by means of the infrared transmitter/receivers 16. In such case, even if the conventional game machine 20 is not equipped with any cable connector or the infrared transmitter/receiver 16, there only need to provide the infrared transmitter/receiver 16 to the cartridge 10A to perform data communications. Alternatively, the infrared transmitter/receiver 16 may be integrally provided somewhere in the housing of the game machine 20.

Figure 7:
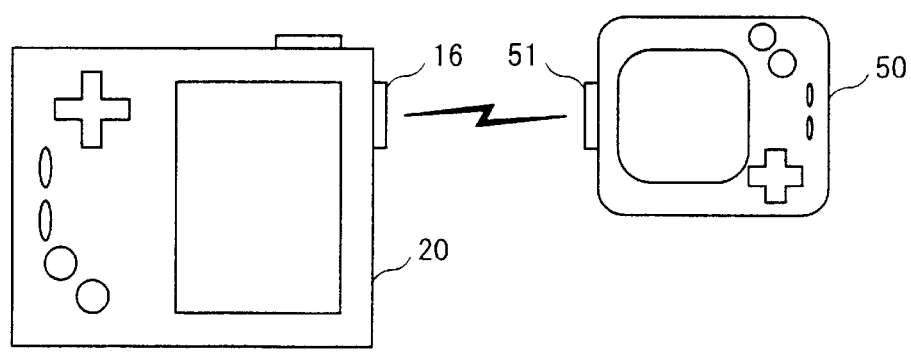
FIG. 7 is a diagram showing the system construction for executing data communications between one game machine and a pedometer incorporated game machine utilizing the infrared transmitter/receiver.

FIG. 7 shows a case where the infrared transmitter/receiver 16 in the game machine 20 and an infrared transmitter/receiver 51 in the pedometer-incorporated game machine 50 perform data communications therebetween.

Figure 8:
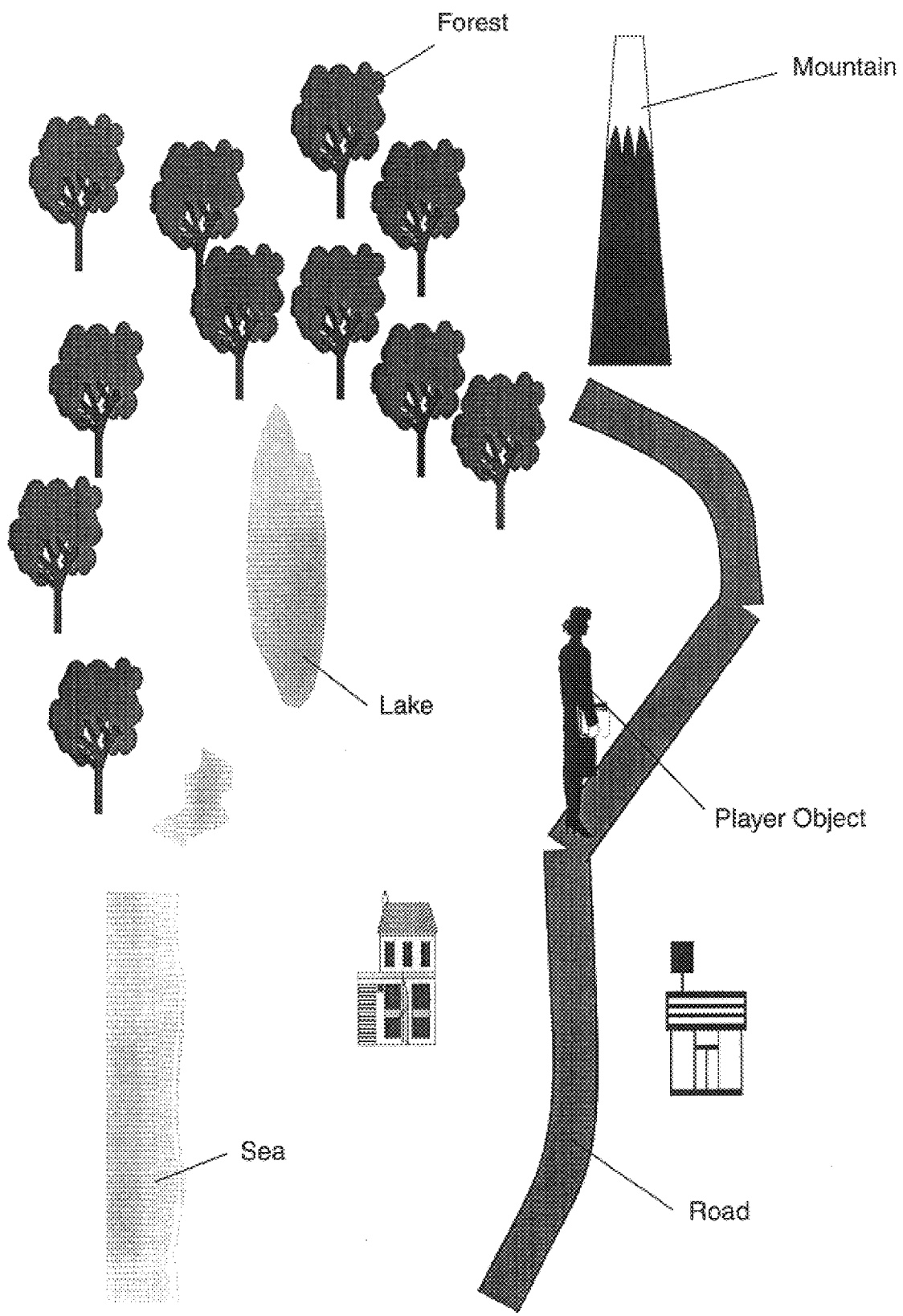
FIG. 8 is a game map showing details of the game carried out by the image-display game system shown in FIG. 1.

Next, with reference to an exemplary game map in FIG. 8, how the game proceeds on the image-display game system of this embodiment is described. For an exemplary game for capturing (collecting) and training the fictionally-created pokemons, and letting such pokemons have battles with other player' pokemons, a main character assumed to be the player himself/herself sets off to capture and collect pokemons. In such a game, the main character travels into pond, woods, or grassy areas where pokemons live, and runs into one of them. There, the player lets his or her own captured/trained pokemon fight against the encountered pokemon. If the player's pokemon beats the other, the player captures the defeated pokemon and adds it to his collection. By repeating this, the player captures pokemons up to the limit (maximum) set in the program, and completes his or her pokemon collection. Herein, the main character can bring along a predetermined number of pokemons (e.g., 6), and such pokemons are designated on-hand pokemons.

In detail, the player depresses the start switch 22c to start the game. After the title screen, the player sees an initial screen for the game (a part of FIG. 8) showing a part of a map for a certain stage shown in FIG. 8. The player moves a player character (or player object) on the map by actuating the direction switch 22a, allowing travel into any possible area where the pokemons live to permit capture thereof. The pokemon' habitats vary according to the pokemon' kinds, for example, in pond or sea for water pokemons, or in grassy area, field, woods for grass pokemons.

The pokemons have unique characteristics, and some come out only at a specific area and time. For example, when the clock circuit 14 indicates the program-set time or time range, appropriateness of such pokemon's appearance, appearance probability, or both is conditionally changed.

By taking nocturnal pokemons (e.g., owl pokemon or bat pokemon) as an example, the appearance probability thereof starts to increase at nightfall or stays at a certain level for a set duration and then becomes higher at midnight. The probability then starts to decrease as dawn approaches, and reaches minimum in the daytime (e.g., appearance probability 0).

Conversely, for diurnal pokemons, the appearance probability thereof reaches its maximum in the daytime, and 0 at midnight. For pokemons changing their hiding areas depending on time range or time, program setting is change accordingly. Specifically, for pokemons living in water in the daytime but on the land at nighttime, program setting is set such that those pokemons change or relocate their habitats depending on time.

Once the player captures a pokemon, its pokemon number is written into the vacant area in the captured pokemon data region 12A. Simultaneously, the pokemon's current hit point (HP), experience point, level, state, technique, ability, and the like, are written into the areas 120 to 128, respectively. If the player's cartridge is a type that includes pokemon's property data of sex, item, and virus, for example, such data is written respectively into the areas 12a, 12b, and 12c.

Note that the virus-infected pokemon is rare, and, thus, its rate of increase for HP, experience point, level, or ability value obtained through the training is set higher than a non-virus-infected pokemon'. Accordingly, the player desires to find the virus-infected pokemon to accelerate his or her pokemon' growth or training. If found, the player acquires the newly-captured virus-infected pokemon as his or her on-hand pokemons (or put all in a training box), and virus-infected pokemon infects his or her own not-yet-infected pokemons, allowing them to grow quicker. As such, with the help of such a trick for accelerating pokemon' growth or level-up as virus infection, the player can advantageously shorten training time taken for the pokemons to reach a certain level.

When the game is played with the game cartridge 10A including pokemon' sex data, the player can select a male and a female from among the captured pokemons of a kind (those having the same pokemon code) and put those in the training box. The time or day is temporarily stored in a register. When the clock circuit 14 indicates that a program-determined number of days has passed, the pokemon couple have a baby, which inherits their property data (e.g., ability, power). The baby is counted as one of the player's own pokemons and is tradable with other players.

Accordingly, the pokemons can be easily collected and the game proceeds quicker. The player can enjoy, with full expectations, training the baby pokemon from its childhood. When the player has several pokemons of a kind, he or she can trade any of those with other player' pokemons of a different kind.

For pokemon trading between owners of new-type cartridge 10A and conventional cartridge 10B, it is preferable to ensure compatibility to the extent possible therebetween as to data for pokemon' sex, item, virus infection, and the like, stored in the areas 12a to 12c. For such purpose, at the time of data transfer from the new-type cartridge 10A to the conventional cartridge 10B, the vacant area 128 stores, with one bit, whether the areas 12a to 12c have any data therein.

If the game is played with the conventional cartridge 10B, the game proceeds without such additional data as pokemon' sex, item, and virus-infection. After data transfer is made from the conventional cartridge 10B to the new-type cartridge 10A, the owner of the new-type cartridge 10A can use such additional data for the game.

When data transfer is made from the conventional cartridge 10B to the new-type cartridge 10A, conversely, sex data not available in the conventional cartridge 10B is determined in accordance with a predetermined rule, and is written into the area 12a of the new-type cartridge 10A. Such predetermined rule may function such that a number in the last digit of the time indicated by the clock circuit 14 determines the sex, for example, male for odd numbers, and female for even numbers.

In this manner, the conventional cartridge 10B and the new-type cartridge 10A can be compatible to the extent possible with each other for pokemon trading, and such compatibility allows a large number of players to exchange data. Furthermore, if the owner of the conventional cartridge 10B additionally purchases the new-type cartridge 10A, he or she can transfer every single pokemon trained in the conventional cartridge 10B to the new-type cartridge 10A and use those transferred pokemons.

As such, captured pokemons, those generated from pokemon couples, and those traded with other players are used to have battles with other player' pokemons.

Figure 19:
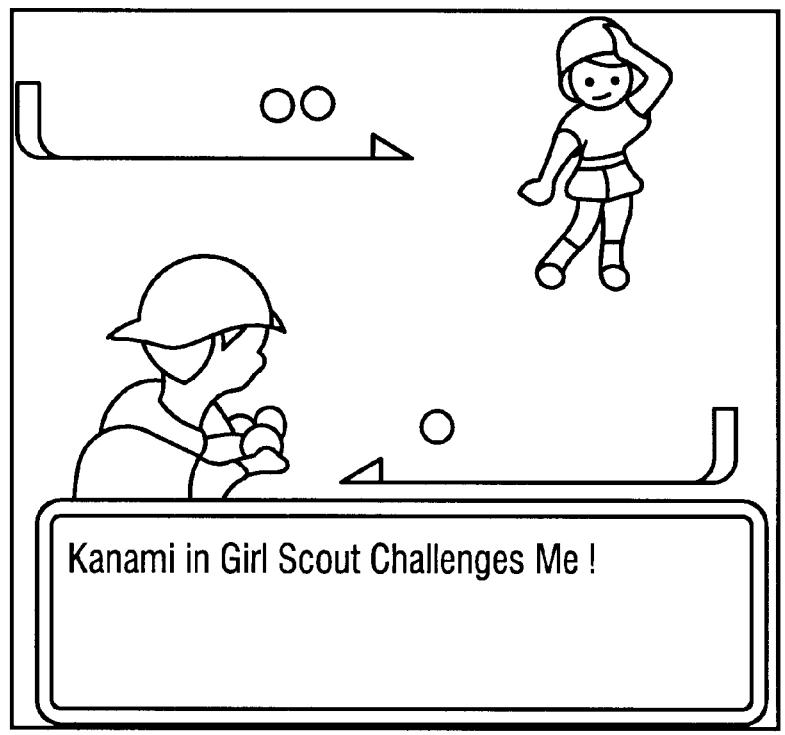
FIG. 19 is a diagram showing an example of battle game screen.
Figure 20:
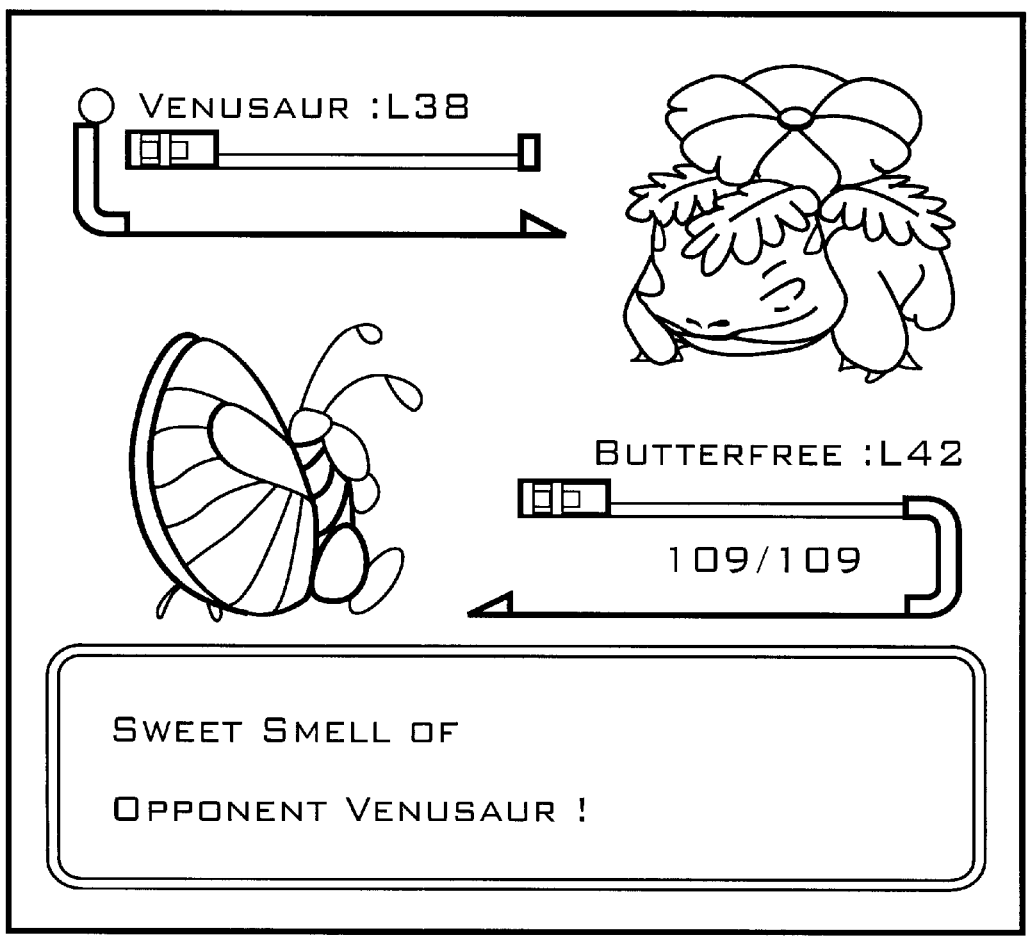
FIG. 20 is a diagram showing another example of battle game screen different from the one shown in FIG. 19.

To have a battle, the connector 29 and 29' of the portable game machines 20 and 20' are connected by a cable. Each player then designates a pokemon and puts it on a battle ground. Exemplary game screens are shown in FIGS. 19 and 20, which will be described later.

Figure 9:
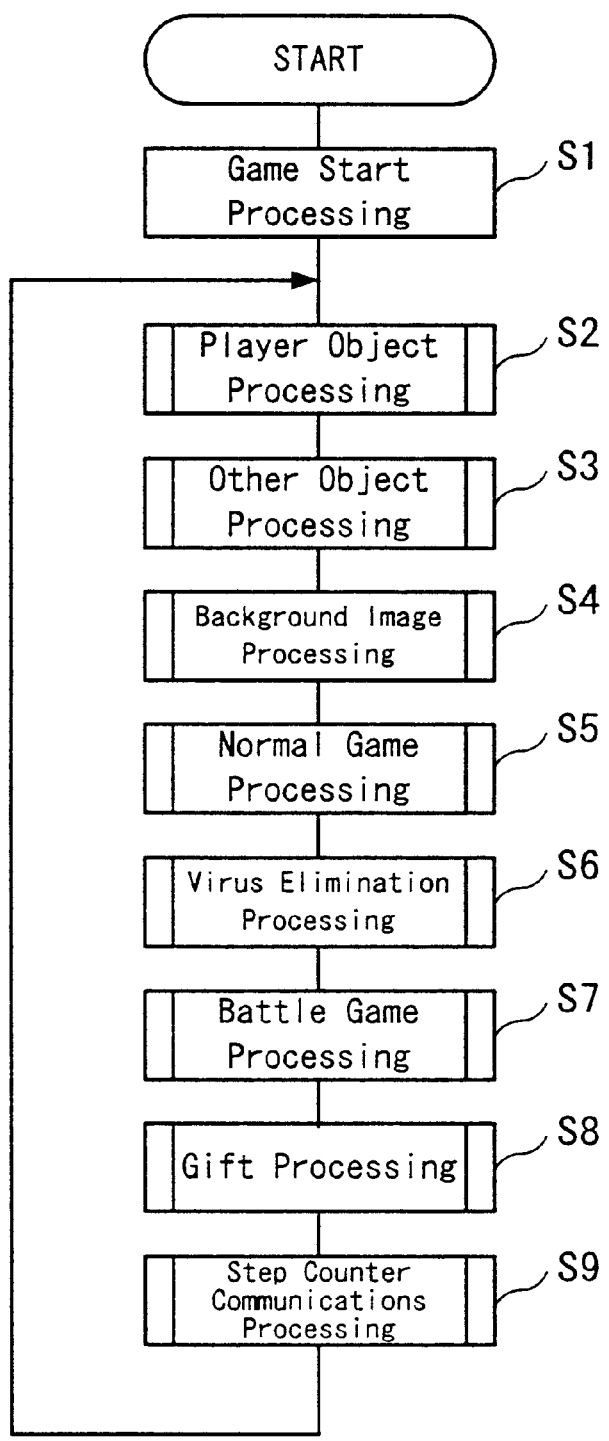
FIG. 9 is a flowchart showing the main operations of the image-display game system in FIG. 1.
Figure 10:
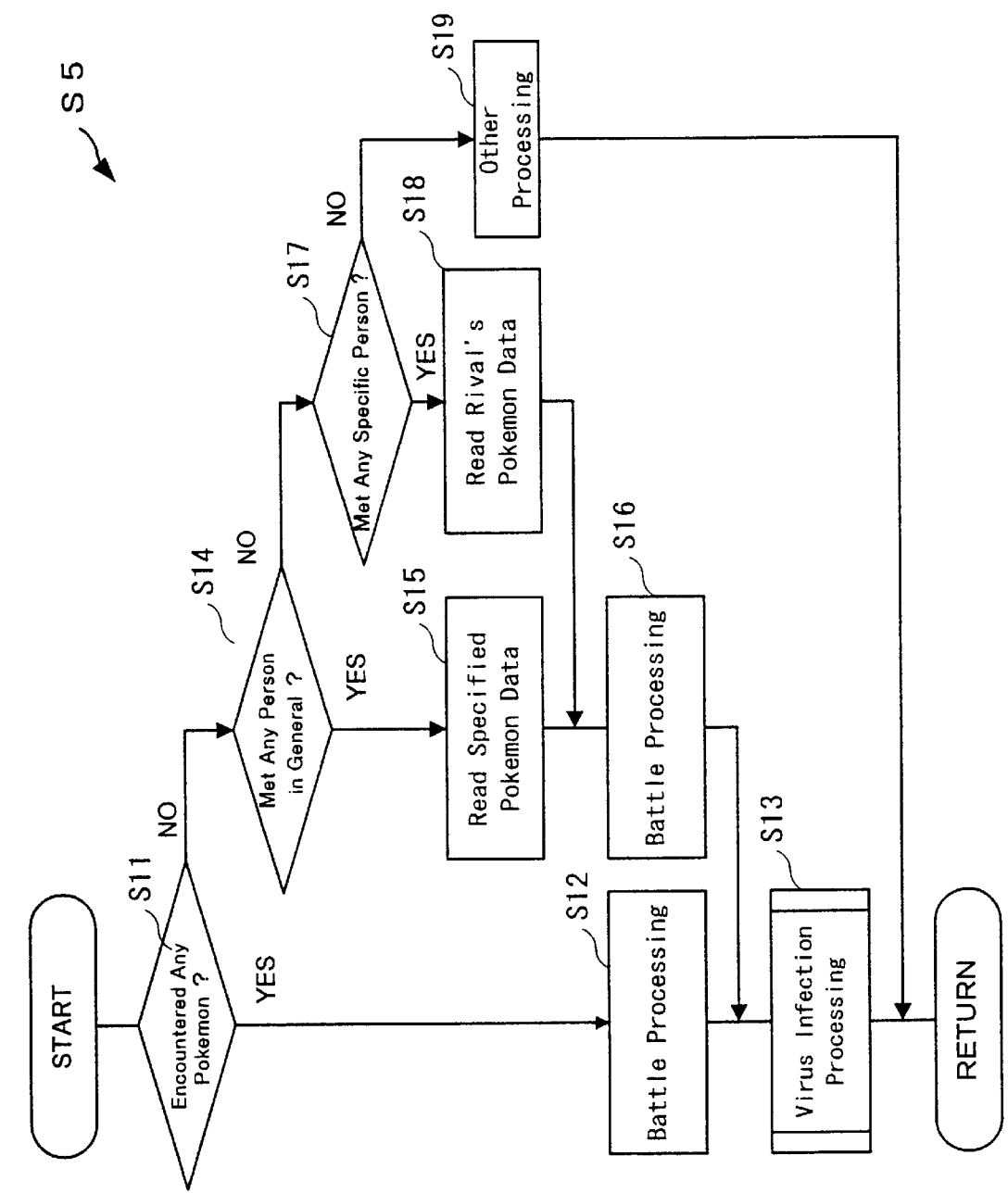
FIG. 10 is a detailed flowchart of a normal game processing subroutine shown in FIG. 9.
Figure 11:
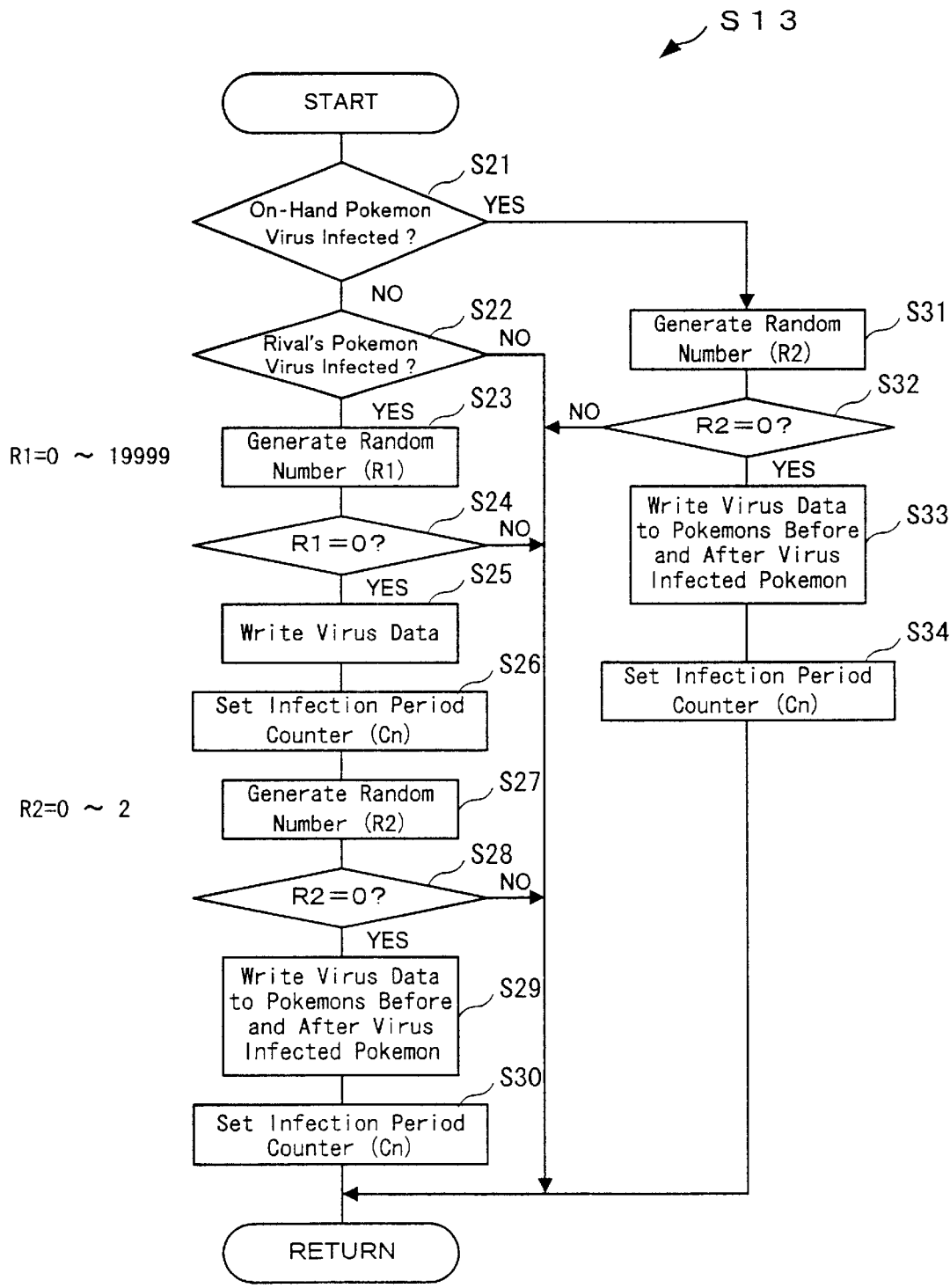
FIG. 11 is a detailed flowchart of a virus infection processing subroutine shown in FIG. 10.
Figure 12:
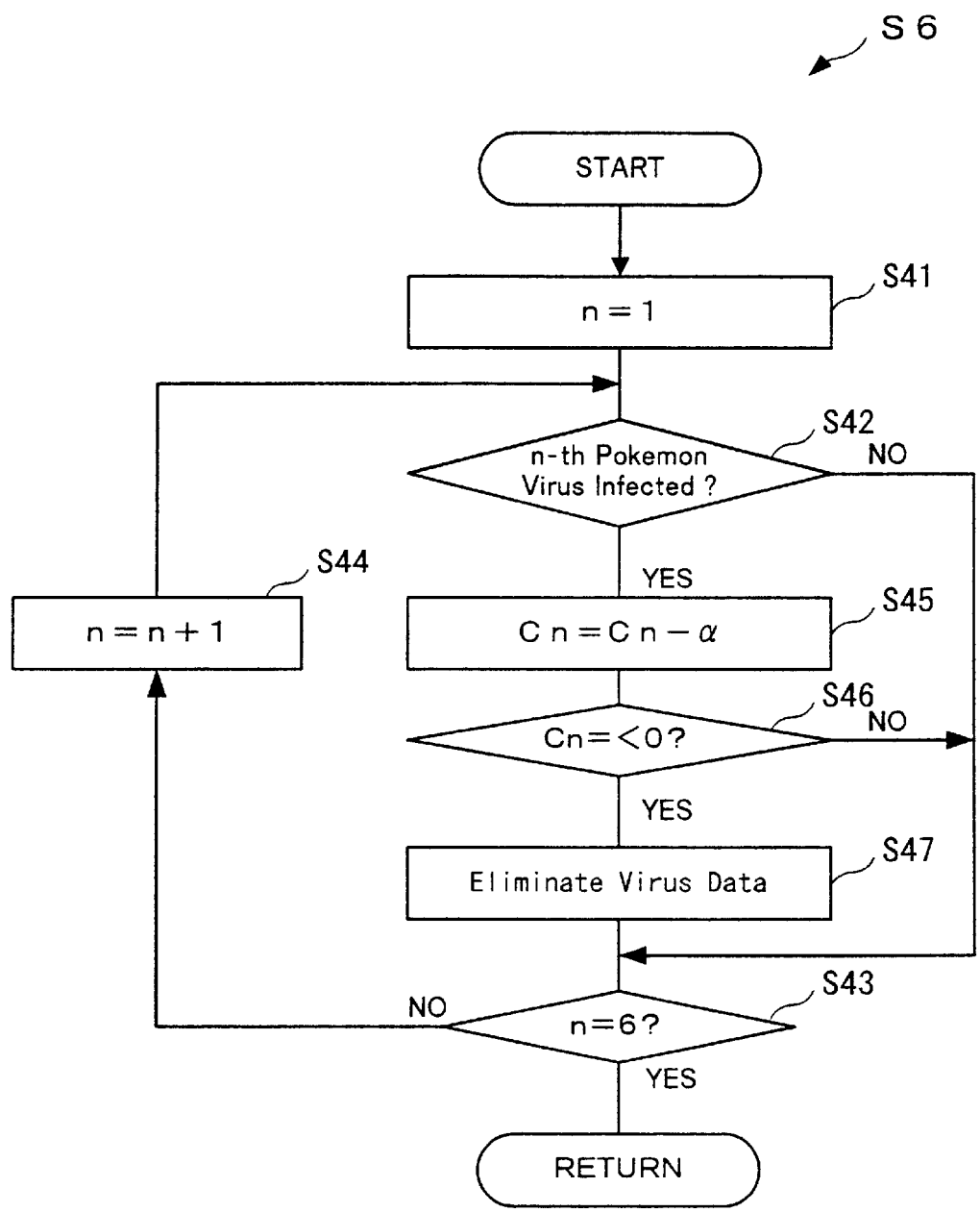
FIG. 12 is a detailed flowchart of a virus elimination processing subroutine shown in FIG. 9.
Figure 13:
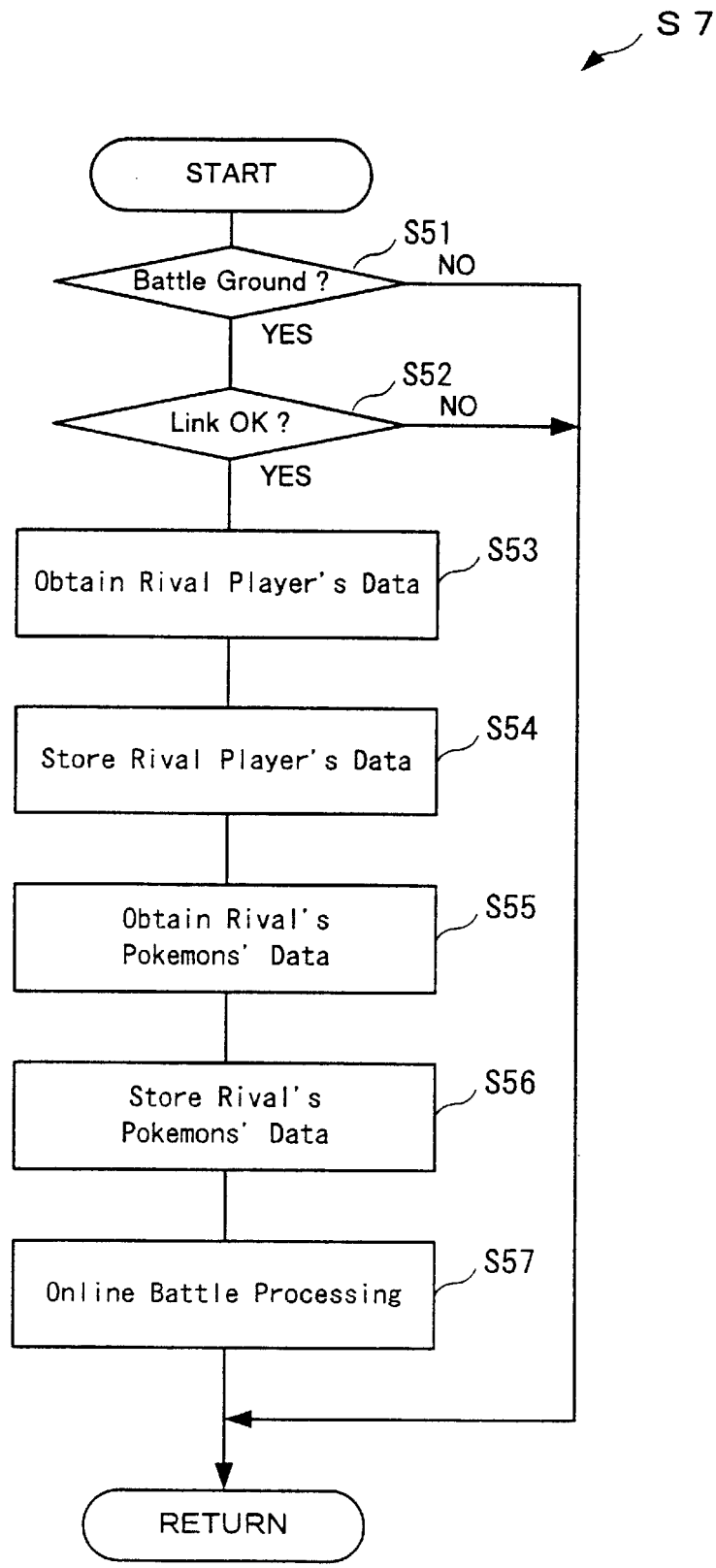
FIG. 13 is a detailed flowchart of a battle game processing subroutine shown in FIG. 9.
Figure 14:
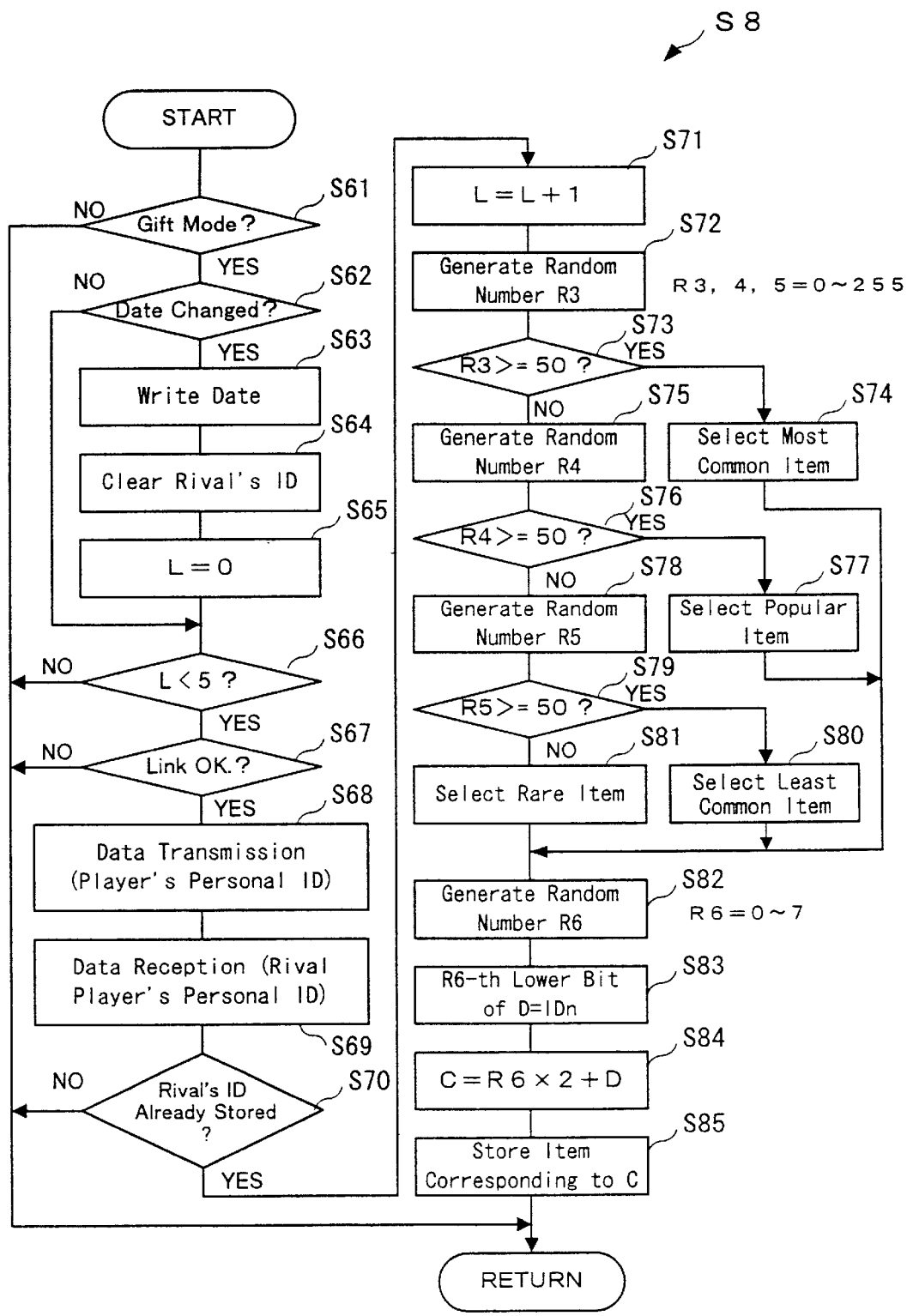
FIG. 14 is a detailed flowchart of a gift processing subroutine shown in FIG. 9.
Figures 16, 17:
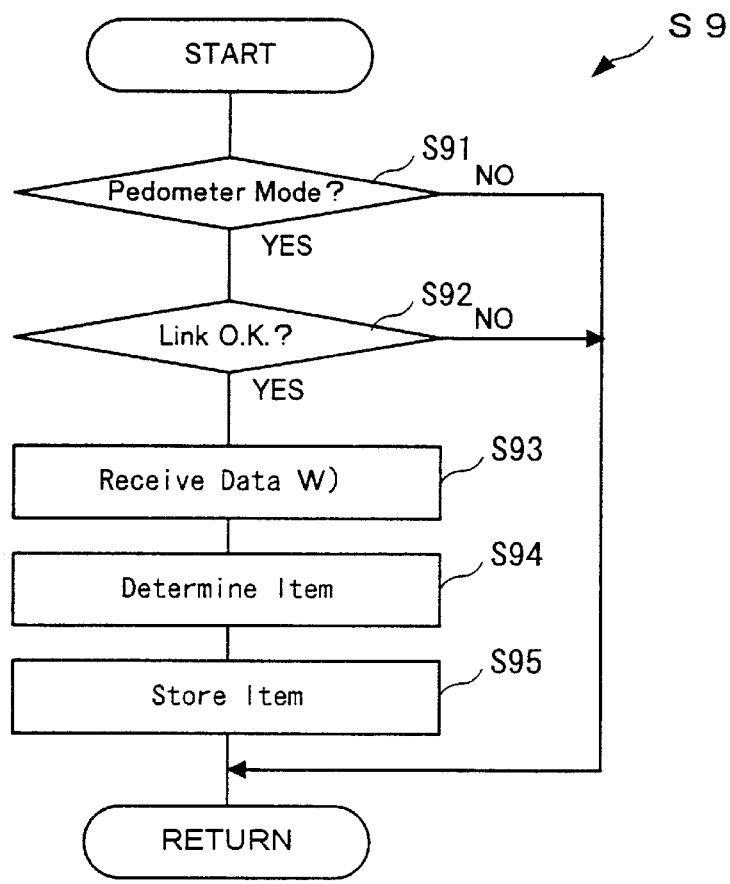
FIG. 16 is a detailed flowchart of a pedometer communications processing subroutine shown in FIG. 9.
FIG. 17 is a diagram in assistance of explaining an item determination method shown in FIG. 16.
Figure 18:
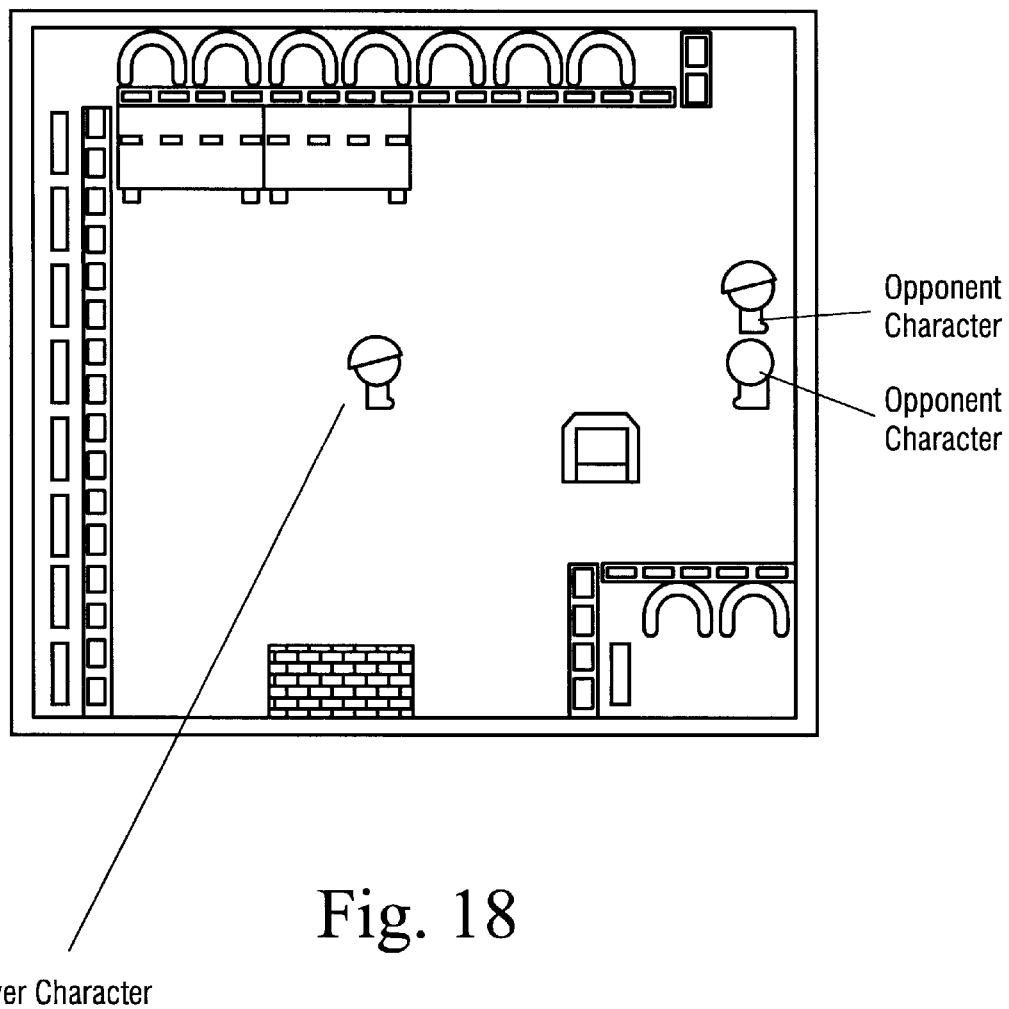
FIG. 18 is a diagram showing an example of normal game screen.

Described below is the operation of the game machine 20 with the cartridge 10A attached by referring to FIGS. 9, 10, 11, 12, 13, 14, 15, and 16. FIG. 9 is a flowchart for the entire process (main routine); FIG. 10 shows a flowchart for normal game processing; FIG. 11 shows a flowchart for virus infection processing; FIG. 12 shows a flowchart for virus elimination processing; FIG. 13 shows a flowchart for battle game processing; FIG. 14 shows a flowchart for mysterious gift processing in which the items (helping items) that are beneficial in the course of the game are presented through ID data communications; FIG. 15 shows the relationship between the numbers obtained by computation in the gift processing and the items; FIG. 16 shows a flowchart for communication processing made with the pedometer; and FIG. 17 shows the relationship between the step-number data provided by the communications processing made with the pedometer and the items.

FIGS. 18, 19, 20, and 21 show various game screens displayed in the course of the above game.

First of all, with reference to the flowchart for the entire process in FIG. 9, it is briefly described how the image-display game system of this embodiment operates.

In step S1, after the start switch 22c is depressed, the CPU 23 carries out processing with respect to a program stored in the ROM 11. In the following description, the CPU 23 is not mentioned for any program processing carried out thereby.

The procedure is started with the game start processing. In the game start processing, a mode selection screen is first displayed for mode command' selection. The mode selection screen shows menus including a game start mode to start the game from initial position, a continue mode to start the game from the position discontinued when previously played, a mysterious gift mode to present the items (helping items) that are beneficial in the course of the game through ID data communications with other players, and a mode to perform data communications with the pedometer.

When the game start mode is selected, the internally-stored RAM 25 is cleared to start the game.

When the continue mode is selected, after the internally-stored RAM 25 is cleared, the RAM 12 in the cartridge 10A is read out for backup data indicating the previous game's process. The backup data is written into the RAM 25. In this manner, the data stored on the RAM 25 at the start of the game is the backup data read out from the RAM 12, and the data stored on RAM 25 is updated as the game proceeds.

In step S2, the player object (or character) processing subroutine is carried out. This processing allows the player object to move in response to the direction switch 22a, and to change in shape in response to the action switch 22c.

In step S3, this processing subroutine is carried out for objects but not for the player object. This processing allows opponent objects to come out or alley objects to be displayed as the player objects moves, in accordance with the program setting.

In step S4, background image processing is carried out. This processing allows background images to change as the player object moves or acts.

In step S5, the normal game processing subroutine is carried out. The details thereof are later described by referring to FIG. 10.

In step S6, the virus elimination (or removal) processing subroutine is carried out. This virus elimination processing is done with respect to any pokemon virus infected in later-described step S13 in FIG. 10. Herein, the virus-infected pokemon(s) are put back to the state before virus infection after a predetermined length of time has passed. The details of the virus elimination processing subroutine in this step are later described by referring to FIG. 12.

In step S7, the battle game processing subroutine is carried out. The battle game processing is done with respect to a mode of having an online battle with the other player's game machine 20 connected through the cable 40, as exemplarily shown in FIG. 5. The details of this subroutine are later described by referring to FIG. 13.

In step S8, the gift processing subroutine is carried out. This gift processing subroutine is carried out when the helping items beneficial in the course of the game are presented through ID data exchange between the game machines 20 by using the infrared transmitter/receivers 16, as exemplarily shown in FIG. 6. The details of this subroutine are later described by referring to FIG. 14.

In step S9, the pedometer communications processing subroutine is carried out. This subroutine processing is done with respect to a mode of transmitting the step-number data from the pedometer-incorporated game machine 50 to the game machine 20 via the infrared transmitter/receivers 15 and 16, as exemplarily shown in FIG. 7. The details of this subroutine are later described by referring to FIG. 16.

With reference to FIG. 10, how the normal game processing in step S5 occurs is shown. In step S11, it is determined whether the main character has encountered any pokemon during his or her travels on the map. As exemplarily shown in the game screen of FIG. 18, if the main character runs into a pokemon (battle character), a determination is so made.

Thereafter, in step S12, the battle processing is carried out. This battle processing allows pokemons (captured and trained) traveling with the main character have battles with wild pokemons hiding on the way. By beating the wild pokemon (battle character), the main character's pokemon increases its experience points, or the wild pokemon is captured.

Thereafter, the virus infection processing subroutine is carried out in step S13. The details thereof are later described with reference to FIG. 11. The processing in step S13 is the end of this subroutine (S5), and the procedure goes to step S6 (FIG. 9).

If the main character is determined as not having encountered with pokemon in step S1, the procedure goes to step S14.

In step S14, it is determined whether the main character has met any person in general (rival called trainer, who captures and trains pokemons). If the main character is determined as having met any person in general during his or her travels on the map as exemplarily shown in the game screen of FIG. 8, the procedure goes to step S15.

In step S15, various data for six pokemons travelling with the main character and fighting for him or her is read out to prepare for a battle. Specifically, the data read out is the one stored in the areas 12O to 12d of the captured pokemon data region 12A under the 1st to 6th pokemon numbers stored in the on-hand pokemon storage region 12B.

The next processing in step S16 is carried out for a battle between the main character (player) and a rival trainer. Therein, images of both the rival trainer and the main character are displayed to indicate that the battle mode has commenced (FIG. 19 shows an exemplary game screen for the battle).

Figure 21:
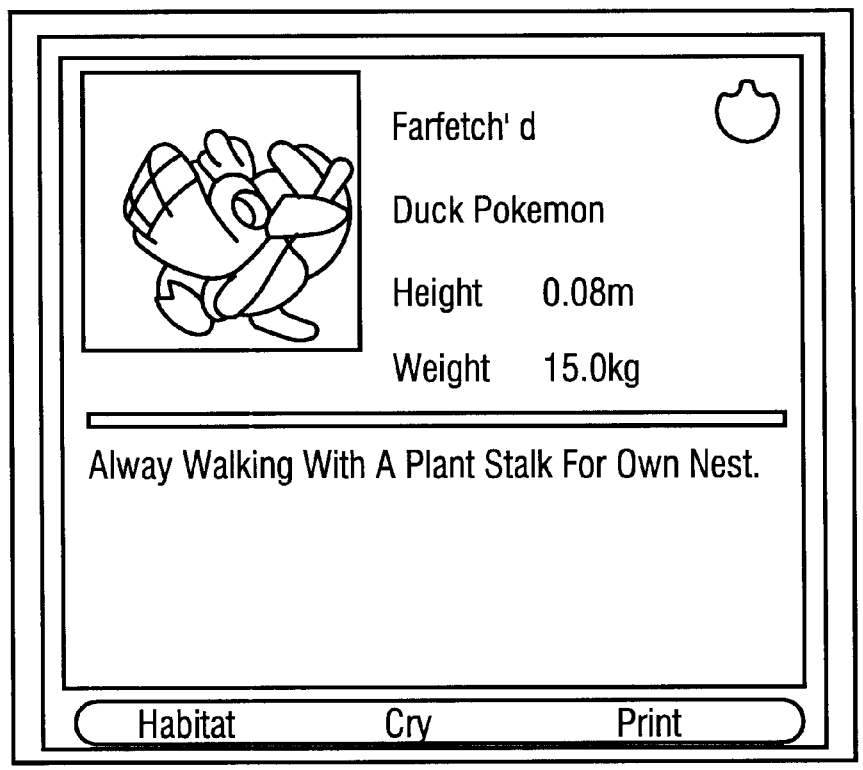
FIG. 21 is a diagram showing an example of a screen in a battle game displaying ability of pokemons which the player possesses.

Thereafter, a pokemon is selected each from among those six to fight for the main character and the rival trainer, respectively, and the selected pokemons are displayed on the battle ground face-to-face (FIG. 20 shows an exemplary game screen for the battle). At this time, each pokemon is displayed with its name, hit point (HP), life, and the like. Additional messages are displayed, indicating each action of the offensive side and defense side. This message changes every time the offensive side and defensive side are switched. As for the battle, the player can see the pokemon' ability (status) by actuating a switch for screen change (FIG. 21 shows an exemplary game screen displaying such status). With the help thereof, the player can know how those six pokemons traveling with the main character will manage the battles. During the battle, if the main character's pokemon successfully beat the rival trainer's, the pokemon increases its experience points. Thereafter, the procedure goes to step S13, and the virus infection processing is carried out.

In step S14, if the main character is determined as not having met any person in general (trainer), the procedure goes to step S17.

In step S17, it is determined whether the main character has met any specific person (a trainer belonging to a player with which a previous online battle occurred. If determined yes, the rival trainer's pokemon data is read out in step S18, and the procedure goes to step S16 for the battle processing. Then, the procedure goes to step S13. If this is the case, the rival trainer's name to be displayed is the other player's name stored in the area 12i (or parental ID data corresponding to the parental ID stored in the area 126). In this manner, by storing the other player's pokemon data in the area 12i at the time of online battle, the player can later play the game as if having a real battle with the other player.

When determined no in step S17, the procedure goes to step S19 for miscellaneous processing, and ends this subroutine (S5). The procedure is now through with this subroutine (S5), and goes to step S6 (FIG. 9).

Next, by referring to FIG. 11, the virus infection processing subroutine in step S13 is described. In this embodiment, a probability of pokemon' virus infection is set to one out of 20,000 battles. If a pokemon is infected, the preceding and subsequent pokemons are virus-infected with a probability of ⅓. The length of time for virus infection (virus-infected endurance period or virus-infected persistent period) is set to vary according to the virus type. In this embodiment, virus infection is not detrimental to the player, and it is welcomed as a conditional or environmental trick for accelerating pokemon' growth or evolution. The operation in step S13 is now described in detail next below.

In step S21, it is determined whether the area 12c of the captured pokemon data region 12A has data (virus data) indicating any pokemon whose pokemon number is stored in the on-hand pokemon storage region 12B on the RAM 25 has been virus infected. If the area 12c is determined as having no data, that means no on-hand pokemon is virus infected, the procedure goes to step S22.

In step S22, it is determined whether any of the rival's pokemons have been virus infected. Such determination is made, in the online communication mode, based on the data stored in the area 12c corresponding to the pokemon numbers stored on the RAM 25 in the rival player's portable game machine 20. Other than in the online battle, the pokemons are set to virus infect through a naturally-virus-infected pokemon (Pokerus) with a probability of 1/20,000. When the rival' pokemons are determined as not having been virus infected, the procedure is now through with the virus infection processing subroutine in step S13, and then goes to step S9 (FIG. 9).

In step S22, if any of the rival's pokemons is determined as having been virus infected, the procedure goes to step S23 and onwards. Therein, the player's on-hand pokemons are subjected to processing to be virus infected with a predetermined probability, and details thereof are as follows.

In step S23, the CPU 23 generates a random number R1 according to the program. Herein, the random number R1 is an integer in the range from 0 to 19999, and is generated at random. Accordingly, it becomes possible to let any pokemon potential for virus infection be a probability of 1/20000.

In step S24, it is determined whether the random number R1 is 0. If not, virus infection is determined as not having occurred, and the procedure is now through with the virus infection processing subroutine (step S13 in FIG. 10, the flowchart in FIG. 11: steps S21 to S34). The procedure now goes to step S9 (FIG. 9).

On the other hand, if the random number R1 is determined as being 0 in step S24, that means any of the on-hand pokemons is virus infected, the player's area 12c under the virus-infected pokemon's pokemon number is provided with data (virus data) in step S25. Since the virus is varied in type, the virus data (virus type data) specifies the virus type. Each virus type differs in virus-infected endurance period or consequence (impact or power) brought about thereby.

In the next step S26, such virus-infected endurance period (Cn; or virus-infected time and endurance period) is written into the miscellaneous area 12d of the captured pokemon data region 12A on the RAM 25 under the virus-infected pokemon's pokemon number, and accordingly a virus-infected period count value Cn is set. This virus-infected period count value Cn varies according to the virus type and is set to "48" if the virus-infected endurance period is 48 hours. The virus-infected period count value is decreased by unit time, and when 0 is reached, the virus loses its infection power. This virus-infected period count value Cn is not restricted to hours but may be days, minutes, seconds, or any other predetermined countable value unit. Furthermore, the region for storing the count value is not restricted to the miscellaneous area 12d but any area on the RAM 25 as long as the area is relevant to the virus-infected pokemon(s).

In the next step S27, another random number R2 is generated based on the program. This random number R2 is an integer not less than 0 and not more than 2, for example, and is used to virus infect other pokemons ranked (arranged) immediately before and after the virus-infected pokemon with the probability of ⅓. In this embodiment, with the random number R2 is 0, those other pokemons ranked immediately before and after the virus-infected pokemon are presumably both virus infected.

In step S28, it is determined whether the random number R2 is 0. If the random number R2 is determined as being 0, that means some of the on-hand pokemons have been virus-infected (Yes in step S24), the procedure goes to step S29 to subject not infected on-hand pokemons predetermined in number to virus infection processing with the predetermined probability.

In step S29, the area 12c is provided with the virus data for the pokemon numbers assigned to those arranged immediately before and after the virus-infected pokemon among those six. In detail, assuming that the pokemon third in order in the on-hand pokemon storage region 12B is virus-infected, the pokemons second and fourth in order are also virus infected. Consequently, the virus data storage area 12c of the captured pokemon data region 12A is provided with the virus data for the pokemon numbers assigned to those second and fourth pokemons.

In step S30, in a similar manner to step S26, the virus-infected period data (Cn) is set to the area 12d of the captured pokemon data region 12A corresponding to the pokemon numbers assigned to the second and fourth pokemons. Herein, if the random number R2 is determined as not being 0 (i.e., R2=1 or 2) in step S28, those arranged immediately before and after the virus-infected pokemon are presumably not virus infected. Accordingly, the procedure is now through with the virus infection processing subroutine (S13), and goes to step S9.

When any of the on-hand pokemons is determined as having been virus infected in step S21, the procedure goes to step S31 to subject the other on-hand pokemons in predetermined number to virus infection. The processing carried out in steps S31 to S34 is similar to that in steps S27 to S30, and those arranged immediately before and after the virus-infected pokemon are subjected to the virus infection processing with the predetermined probability. Thereafter, the procedure goes to step S9.

As already described above, the virus-infected pokemon starts to grow or evolve at a quicker rate, and that is advantageous for the game process. To achieve that, when a pokemon is qualified for level-up in the normal game processing, a level-up value to be added for one specification varies depending on whether the pokemon has been virus infected. As another example of providing the virus-infected pokemon with some ability advantageous in the course of the game, depending on the virus type, the pokemon may suffer less damage when attacked by an opponent (or its defense power is increased) or its attack power is increased.

Next, by referring to FIG. 12, the virus elimination processing subroutine in step S6 (FIG. 9) having the virus eliminated (removed) after the virus-infected endurance time has passed is described in detail. In step S41, a variable n is set to 1 for storage in a register region (not shown) on the RAM 25.

In step S42, the on-hand pokemon storage region 12B is selected for the pokemon number assigned to the 1st pokemon, which is equivalent to the variable n (1 at the beginning). Thereafter, the area 12c of the captured pokemon data region 12A whether there is any virus data under the 1st pokemon's pokemon number is determined. If no virus data is stored, the procedure goes to step S43.

In step S43, it is determined whether the variable n is 6. If not n=6, the procedure goes to step S44.

In step S44, n is incremented by 1, and the procedure returns to step S42. In step S42, the area 12c of the captured pokemon data region 12A whether there is any virus data under the 2nd pokemon's pokemon number is determined. If stored, the procedure goes to step S45.

In step S45, the virus-infected period count value (Cn) is decreased by a predetermined value ($\alpha$) (Cn=Cn-$\alpha$). As already described in step S26 (FIG. 11), the virus-infected period count value Cn indicates how long the pokemon specified by the pokemon number designated by the variable n has been virus infected. The predetermined value $\alpha$ corresponds to a length of time taken to repeat the processing in step S45. As an example, assuming that the virus-infected period count value Cn is exactly 48 hours and the processing in step S45 is repeated every second, the virus-infected period count value Cn is decreased by a second on the basis of $\alpha$=1 second.

In step S46, it is determined whether the virus-infected period count value Cn became 0 or smaller, and if not 0, the procedure goes to step S43. In step S43, it is determined whether the variable n is 6. If not n=6, n is incremented by 1 in step S44, and the procedure returns to step S42.

As such, by repeating a series of operation including steps S42, S43, and S44, or a series of operation including steps S42, S45, S46, S43, and S44, each of the six pokemons is successively subjected to virus infection determination processing and processing of decreasing the virus infected time. When the variable n becomes 6 in step S43, each of the six pokemons is determined as being subjected to virus infection determination processing and decreasing the virus infected time processing, and the procedure then goes to step S7.

When the virus-infected period count value Cn is determined as being 0 or smaller in step S46, the area 12c of the captured pokemon data region 12A on the RAM 25 is cleared of virus data for the pokemon number specified by the variable n. In other words, data indicating no virus infection is written thereto. Thereafter, in step S43, it is determined whether the variable n is 6, and if not n=6, n is incremented by 1 in step S44. The procedure then returns to step S42. The operation of steps S45, S46, S43, and S44 or the operation of steps S45, S46, S47, and S43 is repeated until each of the six pokemons is subjected to the virus elimination processing. The procedure then goes to step S7.

The operation of steps S45 and S46 may be alternatively done as follows. Assuming that a count value C1 indicates a time when the virus loses its power instead of the virus-infected period count value Cn and α indicates a length of time after virus infection, determination is made in one step whether C1−α is 0 or smaller.

A player who captures a virus-infected pokemon is free to lend it to another player within the virus-infected endurance time and get it back after the other player's pokemon is virus-infected. Since the virus-infected pokemon is superior in ability compared with the non-virus infected, many players are eager to let their pokemons become virus infected. Accordingly, the player who luckily captures a virus-infected pokemon with a considerably low probability becomes busy with other players' requests for pokemon data exchange, thereby increasing popularity among other players. As such, the game is useful for cultivating friendship with other players.

Next, by referring to FIG. 13, the online battle game processing subroutine in step S7 is described in detail. For the online battle game, two game machines 20 are connected to each other through the cable 40, and each player selects the online battle mode on the mode selection screen.

In response thereto, in step S51, it is determined whether the place where the main character stands is a battle ground. If determined yes, the procedure goes to step S52.

In step S52, it is determined whether those two game machines 20 connected through the cable 40 are under normal link condition. If yes, the procedure goes to step S53.

If the place where the main character stands is determined as not the battle ground in step S51 (No), or if the link condition is determined as not normal in step S52 (No), the procedure skips the operation of later-described steps S53 to S57, and goes to step S8 of the main routine shown in FIG. 9.

In the online battle mode (Yes both in steps S51 and S52), the ID data is transmitted to and from the rival player's game machine 20 through the communications cable in step S53.

In step S54, the rival player's ID data is stored in the player's battle character data area of the battle data storage region 12C on the RAM 25.

In step S55, the rival player's pokemon data for six pokemons is read.

In step S56, the pokemon data for six pokemons is stored in the battle pokemon data area of the battle data storage region 12C on the RAM 25.

In step S57, the online battle processing is carried out. The procedure then goes to step S8 of the main routine.

So far, the system in which two game machines 20 are connected through the cable 40 is exemplarily described. As an alternative to the cable 40, as exemplarily shown in FIG. 6, those two game machines 20 can certainly be connected through the infrared transmitter/receivers 16.

Next, by referring to FIG. 14 for the mysterious gift processing subroutine S8, how the mysterious gift (helping item) is presented based on other player's ID code obtained through communications is described. Prior to starting the gift mode, two players place their game machines 20 so that the infrared transmitter/receivers 31 or the infrared transmitter/receivers 16 of the cartridge 10 are opposed to each other, establishing infrared communications. Next, both players select a mode of presenting the mysterious gift through ID data communication or exchange between the game machines 20 on the above-described mode selection screen. In response thereto, the gift processing subroutine shown in FIG. 14 is started.

That is, in step S61, it is determined whether the gift mode is selected. If yes, the procedure goes to step S62.

In step S62, it is determined whether the date is changed. If yes, new date is written into a new data storage area 12$i$ on the RAM 25 in step S63.

In step S64, the rival player's ID data in the area 12$g$ is cleared. In step S65, a register L (not shown, but included in the area 12$i$) is cleared for the number of players with whom ID communications or exchange is performed for the day (or 0 is written).

In step S66, it is determined whether the register L indicates 5 or smaller. Such determinations made in steps S62 S66 are for keeping the upper limit allowed for presenting gift (or ID data communications) is 5 players in a day.

In step S67, it is determined whether the link for communications using the infrared transmitter/receiver is normally secured. If secured, the player's (his/her own) ID data is transmitted in step S68.

In step S69, the ID data (IDn) transmitted from the other player is received, and is written into the miscellaneous area 12$g$.

In step S70, whether the received ID data (IDn) is identical to the ID data (IDn) already stored in the area 12$g$ is determined. If identical, the gift processing is terminated (returned) and the procedure goes to step S9. This is because the ID data exchange is allowed only once for the same player in a day. On the other hand, if determined as not identical the value of the register L is incremented by 1 in step S71, and the number of players with whom ID data has been exchanged for the day is counted.

Furthermore, in the following steps S72 to S85, processing provides rare items or items beneficial in the course of the game based on the ID data (IDn).

In detail, a random number R3 is generated in step S72. The random number generated in this step and those R4 and R5 generated in steps S75 and S78 are all in the range of 0 to 255.

In step S73, it is determined whether the random number R1 is 50 or larger, and if determined as being 50 or larger, a most-common item group (group in the first column in FIG. 15) is selected. Herein, a probability for the random number being 50 or larger at the first stage is 205/255 □à about ⅘, and accordingly the most-common item group is selected.

If the random number R3 is determined as being 50 or smaller in step S73, the probability for such random number R3 is about ⅕. Therefore, as the procedure goes through step S76 and then S79, the probability will be multiplied by ⅕ every time the procedure reaches a stage of generating a random number (steps S75, 78, S82), and a rarer item is provided as the probability of such a number is decreased.

For this purpose, the random number R4 is generated in step S75. In step S76, it is then determined whether the random number R4 is 50 or larger, and if yes, a popular item group (group in the second column in FIG. 15) is selected.

If the random number R4 is 50 or smaller, the random number R5 is generated in step S78.

In step S79, it is determined whether the random number R5 is 50 or larger, and if yes, a least-common item group (group in the third column in FIG. 15) is selected.

If the random number R5 is 50 or smaller, a rare item group (group in the last column in FIG. 15) is selected in step S81.

In such manner, among the item groups classified according to the probability of random numbers R3, R4, and R5 in steps S74, S77, S80, and S81, an item to be presented based on the ID data (IDn) is determined through the later-described processing.

Furthermore, a random number R6 is generated in step S82. The random number R6 is data varied in type, and is assigned 8 numbers from 0 to 7. The random number is selected with a probability of ⅛.

In step S83, the area 12g is referred to for the other player's ID data (IDn) having ID data communications or exchange with, and based on the lower 8-bit data of the ID data, a variable D is determined. Specifically, out of the lower 8-bit of the ID data IDn, the value arranged in the numerical order specified by the random number R6 is set to the variable D. In FIG. 14, an expression is found as the random number R6-th lower bit of D=IDn.

In step S84, the variable D and the random number R6 as a part of the ID data (IDn) are computed with a predetermined equation (e.g., C=R6×2+D) so as to obtain an item number C.

In step S85, item data corresponding to the determined item number C is written into the item storage area 12h for storage. At the same time, an object and/or symbol of the item is displayed on the liquid crystal display 27 to let the player know what item is presented. Such items to be presented based on the communicated or exchanged ID data are shown in the right table in FIG. 15, and are preferably impossible or difficult to obtain through the normal game play.

Furthermore, in order to not always present the same item to one ID data (IDn), the item type may be programmed to be based on data. Such data is obtained by dividing the ID data (IDn) into a plurality of bytes and inverting bit data in a byte specified by the random number, or bit-shifting the ID data for the number of times of the random number. Additionally, in order to determine the item type to be presented through ID data exchange with the other player, the ID data does not have to be correlated with the random number as described above, but may be independently used to determine the item type.

As described in the foregoing, by making the items beneficial in the course of the game (helping data or items) available through the ID data communications or exchange with other players, the players become very enthusiastic about communicating/exchanging ID data with other players to find the rare items. Thus, communications and exchange become active. As a result, the players become communicative and enjoy the company of others by sharing the same interest in the game. Even unsocial kids become more social through discussion about the game.

Furthermore, since both of the ID data and random numbers are determination factors for item type, one ID data may not lead to the same item even if the player exchanges ID data with the same player on another day. Therefore, the players may not easily bore, and thus can play the game over and over for a long time.

So far, the system in which two game machines 20 are connected utilizing the infrared transmitter/receiver 16 is exemplarily described. As an alternative to the infrared transmitter/receiver 16, as exemplarily shown in FIG. 5, those two game machines 20 can certainly be connected through the cable 40.

Next, by referring to FIG. 16, a case where the step-number data is received through infrared communications from the pedometer-incorporated game machine 50 is described. In the step-number communications mode, the player walks with the pedometer for the purpose of taking steps as many as possible, and he or she presents the number of steps to the main character or pokemons in the game. In this manner, the player can enjoy a mode not available by playing the game only with the game cartridge 10A. That is, the game available from the cartridge 10A is diversified to a further extent by being connected with the game machine different in type, and keeps stimulating the players to challenge the game.

Prior to starting the step-number data communications mode, as exemplarily shown in FIG. 7, the player places the infrared transmitter/receiver 51 of the pedometer-incorporated game machine 50 in such manner as to be opposed to the infrared transmitter/receiver 31 internally-provided in the game machine 20 or the infrared transmitter/receiver 16 provided to the cartridge 10A, and establishes an environment for infrared communications. Thereafter, the player selects the step-number data communications mode on the above-described mode selection screen (step S1). In response thereto, the pedometer communications subroutine in step S9 is started. Hereinafter, the operation thereof is described in detail with reference to FIG. 16.

In step S91, it is determined whether the pedometer communication mode is selected.

In step S92, it is determined whether the infrared transmitter/receivers 31 and 51 are securely linked, and if securely linked, the procedure goes to step S93.

In step S93, the area 12i on the RAM 25 is provided, for storage, with step-number data W (or data relevant to the step number obtained by dividing the step-number data by a predetermined step number) transmitted from the pedometer-incorporated game machine 50.

In step S94, based on the equation shown in the table of FIG. 17, the item type is determined for the step-number data W.

In step S95, the item data is stored in the area 12h on the RAM 25. In this case, the larger the value of the step-number data W becomes, the more rare the item type in the normal game play is presented according to the step-number data. Accordingly, the player will not remain stationary while playing the game, rather is encouraged to exercise, e.g., walk as a part of the game.

During or at the end of the game, a command "save data" is displayed, and if selected, the CPU 23 transfers the data stored in the storage regions 12A to 12E on the RAM 25 in the game machine 20 to the RAM 12 for writing. In this manner, the RAM 12 is provided with the data relevant to the game process, and the data is backed up exemplarily by battery (not shown) for the next play.

In step S91, on the other hand, if determined that the communications mode with the pedometer-incorporated game machine 50 is not selected, the steps S92 to S95 are skipped to terminate this subroutine (S9). The procedure then returns to the player object processing subroutine in step S2.

By referring to the table in FIG. 17, it is now briefly described how the item type presented relevant to the step-number data W is determined.

First, when the step-number data W is smaller than a predetermined value b1, an item b1 is presented. When the step-number data W is larger than the predetermined value b1 but smaller than a predetermined value b2, an item b2 is presented. When the step-number data W is larger than the predetermined value b2 but smaller than a predetermined value b3, an item b3 is presented. When the step-number data W is larger than the predetermined value b3 but smaller than a predetermined value b4, an item b4 is presented. And when the step-number data W is larger than the predetermined value b4, an item b5 is presented. Although a predetermined value bN (arbitrary integer) is set to b1 to b4 in this embodiment, the range for the value may be increased or decreased as required, or the predetermined value bN may be arbitrarily set. In such a case, the game becomes more interesting.

Note that the description in the foregoing is made for a roll playing game exemplarily played for capturing and training pokemons. However, the present invention is technically applicable to other type of games such as action game or sports game. If this is the case, the item type to be presented based on the ID data and/or the step-number data is changed according to the type of the game.

Further, according to the type of the game, pokemon' virus infection may be altered to disease contagious to person or animal favorable for the game process if infected, and such favorableness is also appropriately altered.

Still further, in the above-described embodiment, although the image-display game device is exemplarily implemented by the portable game machine and a corresponding game cartridge, a video game machine connected to a television receiver will also do. In such case, the information storage medium may be implemented by a game cartridge, optical storage medium such as CD-ROM or DVD, or magnetic disk.

While the invention has been described in detail, the foregoing description is in all aspects illustrative and not restrictive. It is understood that numerous other modifications and variations can be devised without departing from the scope of the invention.

What is claimed is:

1. An image-display game system in which at least two image-display game devices are structured for data communications therebetween, the image-display game devices each comprise:
    a program store in which a game program involving characters captured during the course of the game is stored;
    a temporary store including, at least, a property data storage region where property data varied in type is stored for characters captured during the course of said game, a help data storage region where data for helping the player during game play is stored, and an ID data storage region where ID data for identifying a player is stored;
    at least one control member actuated by the player for controlling, at least, an operation of capturing characters and an operation of performing data communications with another player;
    a communications link for communicating with another player's image-display game device;
    a processor for carrying out, under the control of said program, image processing to change a displayed image in response to said at least one control member, and changing said property data based on the state of said at least one control member to write the data in the storage region corresponding to said temporary store; and
    a display for displaying a result obtained through the processing carried out by said processor, wherein,
    said game program
        generates, when one of said image-display game devices and the other of said image-display game devices are made data communicable by said communications link, and when data communications is selected by said at least one control member, in response to said ID data transferred from one image-display game device to the other image-display game device, the help data processed by said processor of the other image-display game device based on the transferred ID data.

2. The image-display game system as described in claim 1, wherein said image-display game device further comprises a clock for at least counting time, and wherein
    said game program store stores
        a program for writing time data indicated by said clock to the storage region of said temporary store in relation to the help data processed based on said ID data,
        a program for determining whether a predetermined length of time has passed based on the time data and a time currently indicated by said clock, and
        a program for prohibiting, when said determination program determines that the predetermined length of time has not yet passed, to perform a process for generating said help data based on other ID data different from the one which has been transmitted.

3. The image-display game system as described in claim 1, wherein said image-display game device further comprises a clock for at least counting time, and
    said game program store stores
        a program for writing time data indicated by said clock to the storage region of said temporary store in relation to the help data processed based on said ID data,
        a first determination program for determining whether the ID data stored in said ID data storage region is identical to ID data transmitted through said communications link,
        a second determination program for determining whether a predetermined length of time has passed based on the time data and a time currently indicated by said clock, and
        a program for prohibiting, when said first determination program determines that the ID data is identical, and said second determination program determines that the predetermined length of time has not yet passed.

4. The image-display game system as described in claim 1, wherein said image-display game device further comprises a clock for at least counting time, and
    said game program store stores
        a writing program for writing time data indicated by said clock to the storage region of said temporary store in relation to the help data processed based on said ID data,
        a first determination program for determining whether the ID data stored in said ID data storage region is identical to ID data transmitted through said communications link,
        a second determination program for determining whether a predetermined length of time has passed based on the time data and a time currently indicated by said clock, and
        a program for limiting, when said first determination program determines that the ID data is identical, and said second determination program determines that the predetermined length of time has not yet passed.

5. The image-display game system as described in claim 1, wherein said communications link is an infrared transmitter/receiver which performs communications using infrared radiation.

6. The image-display game system as claimed in claim 1, wherein the help data generation program included in said game program store generates, based on the transfer-red ID data, item data of an item beneficial to the player for helping the player during game play.

7. The image-display game system as claimed in claim 1, wherein the help data generation program included in said game program store generates, based on the transferred ID data, item data of an item beneficial to the player for helping the player during game play and in a way which is not otherwise obtainable during game play.

8. An image-display game system comprising at least two sets of an information storage medium having a game program store and an image-display game device detachable to the information storage medium, and further comprising a communications link provided to permit communication between the image-display game devices said information storage medium comprises:
  a program store in which a game program is unalterably stored;
  a temporary store including, at least, a property data storage region where property data is stored for characters captured by a player during the game process, a help data storage region where data for helping a player during game play is stored, and an ID data storage region where ID data for identifying a player is stored; and
  a housing in which said program store and said temporary store are housed, and wherein
said image-display game device comprises:
  at least one control member actuated by the player for controlling, at least, an operation of capturing characters and an operation of performing data communications with another player;
  a processor for performing information processing in response to said at least one control member and based on the stored program; and
  a display for displaying an image obtained through processing performed by said processor, wherein,
using said program stored in said program store, said processor carries out image processing to change a displayed image in response to said at least one control member, and changing the property data to be written into said temporary store based on the state of said at least one control member to change the character' images based on the property data, and wherein
said game program store further generates, when one of said image-display game devices and the other of said image display devices are permitted to communicate by said communications link, and said ID data transferred from one image-display game device to the other image-display game device, the help data processed by said processor of the other image-display game device based on the transferred ID data, and writes the help data to said help data storage region.

9. The image-display game system as claimed in claim 8, wherein said image-display game device is a portable game machine, and
  said communications link is an infrared transmitter/receiver integrally provided to the housing of said information storage medium.

10. The image-display game system as described in claim 8, wherein said image-display game device is a portable game machine, and
  said communications link is an infrared transmitter/receiver integrally provided to said image-display game device.

11. An information storage medium for use in an image-display game system where at least two image-display game devices communicate with each other, wherein
  said image-display game devices each comprise: a temporary store, at least one control member actuated by a player for controlling at least an operation of capturing a character and an operation of performing data communications with another player; a communications link for performing the data communications with said image-display game device possessed by another player; a processor; and display for displaying a result processed by the processor, and wherein the temporary store includes a property data storage region where property data is stored for characters captured during the course of a game, a help data storage region where data for helping a player during the game process is stored, and an ID data storage region where ID data for identifying a player is stored, wherein the information storage medium includes information processed by said processor, and including
  a program for carrying out an image processing routine for changing an image on said display in response to said at least one control member, and changing said property data responding to the game process based on the state of said at least one control member to write the data into the storage region corresponding to said temporary store, and
  a program for generating, when one of said image-display game devices and the other of said image-display game devices are made data communicable via said communications link, and when data communications is selected by said at least one control member, in response to said ID data transferred from one image-display game device to the other image-display game device, the help data processed by said processor of the other image-display game device based on the transferred ID data.

* * * * *